United States Patent
Baduge

(10) Patent No.: US 9,660,767 B2
(45) Date of Patent: May 23, 2017

(54) COMMUNICATION CONTROL APPARATUS, COMMUNICATION CONTROL METHOD, AND COMPUTER-READABLE NON-TRANSITORY RECORDING MEDIUM

(71) Applicant: PANASONIC INTELLECTUAL PROPERTY MANAGEMENT CO., LTD., Osaka-shi, Osaka (JP)

(72) Inventor: Thilmee Baduge, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/334,379

(22) Filed: Oct. 26, 2016

(65) Prior Publication Data

US 2017/0048025 A1    Feb. 16, 2017

Related U.S. Application Data

(62) Division of application No. 14/474,920, filed on Sep. 2, 2014, now Pat. No. 9,515,778.

(30) Foreign Application Priority Data

Sep. 11, 2013   (JP) .................................. 2013-187981

(51) Int. Cl.
    *H04L 1/18*    (2006.01)
    *H04L 1/08*    (2006.01)

(52) U.S. Cl.
    CPC ................ *H04L 1/08* (2013.01); *H04L 1/189* (2013.01); *H04L 1/1816* (2013.01); *H04L 1/1838* (2013.01)

(58) Field of Classification Search
    CPC ....... H04L 1/08; H04L 1/1816; H04L 1/1838; H04L 1/189
    See application file for complete search history.

(56) References Cited

U.S. PATENT DOCUMENTS

| 7,079,854 | B2 | 7/2006 | Lee et al. |
| 7,133,364 | B2 | 11/2006 | Park |

(Continued)

FOREIGN PATENT DOCUMENTS

| JP | 2005-045469 | 2/2005 |
| JP | 3871661 | 1/2007 |

(Continued)

*Primary Examiner* — Esaw Abraham
(74) *Attorney, Agent, or Firm* — Greenblum & Bernstein, P.L.C.

(57) ABSTRACT

A communication control apparatus is provided for controlling recovery of data loss during data communication from a first communication device to a second communication device, which includes an obtaining section configured to obtain a temporal change in a communication load between the first communication device and the second communication device. The communication control apparatus also includes a change section configured to dynamically change a permitted time and an interval between transmissions on the basis of the temporal change in the communication load, the permitted time being a time that is permitted to be used by the second communication device for recovery of data loss and the interval between transmissions being an interval between transmissions of a retransmission request message. The communication control apparatus further includes a retransmission control section configured to control transmission of the retransmission request message in accordance with the interval between transmissions.

6 Claims, 18 Drawing Sheets

(56) References Cited

U.S. PATENT DOCUMENTS

| | | | |
|---|---|---|---|
| 7,383,463 B2* | 6/2008 | Hayden | G06F 11/2069 714/4.11 |
| 7,428,271 B2 | 9/2008 | Han et al. | |
| 7,447,235 B2* | 11/2008 | Luby | H03M 13/6547 341/107 |
| 7,542,438 B2* | 6/2009 | Jang | H04W 88/04 370/312 |
| 7,725,136 B2 | 5/2010 | Tamura | |
| 7,881,200 B2* | 2/2011 | Lee | H04L 1/0002 370/235 |
| 7,937,437 B2* | 5/2011 | Fujii | G06F 9/505 709/203 |
| 8,458,567 B2* | 6/2013 | Luby | H03M 13/6547 370/476 |
| 8,726,118 B2 | 5/2014 | Tanigawa et al. | |
| 8,756,463 B2 | 6/2014 | Kang | |
| 8,775,658 B2* | 7/2014 | Barreto | H04L 49/90 370/235 |
| 8,797,879 B2 | 8/2014 | Lee et al. | |
| 8,811,180 B2 | 8/2014 | Ozawa | |
| 8,879,480 B2* | 11/2014 | Moon | H04L 1/1893 370/329 |

FOREIGN PATENT DOCUMENTS

| | | |
|---|---|---|
| JP | 2007-150859 | 6/2007 |
| JP | 4699187 | 6/2011 |
| JP | 5117512 | 1/2013 |
| WO | 2011/064810 | 6/2011 |

* cited by examiner

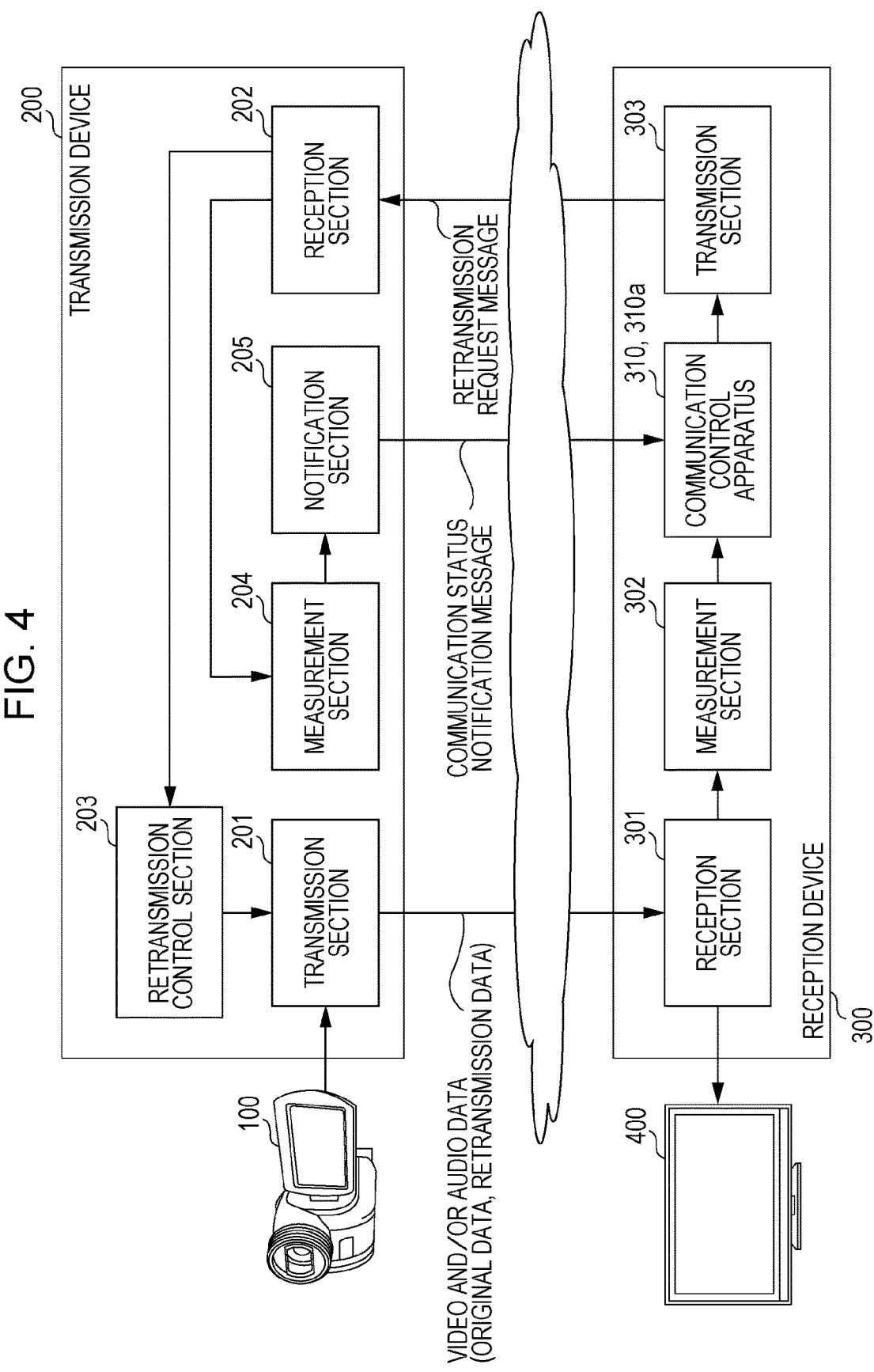

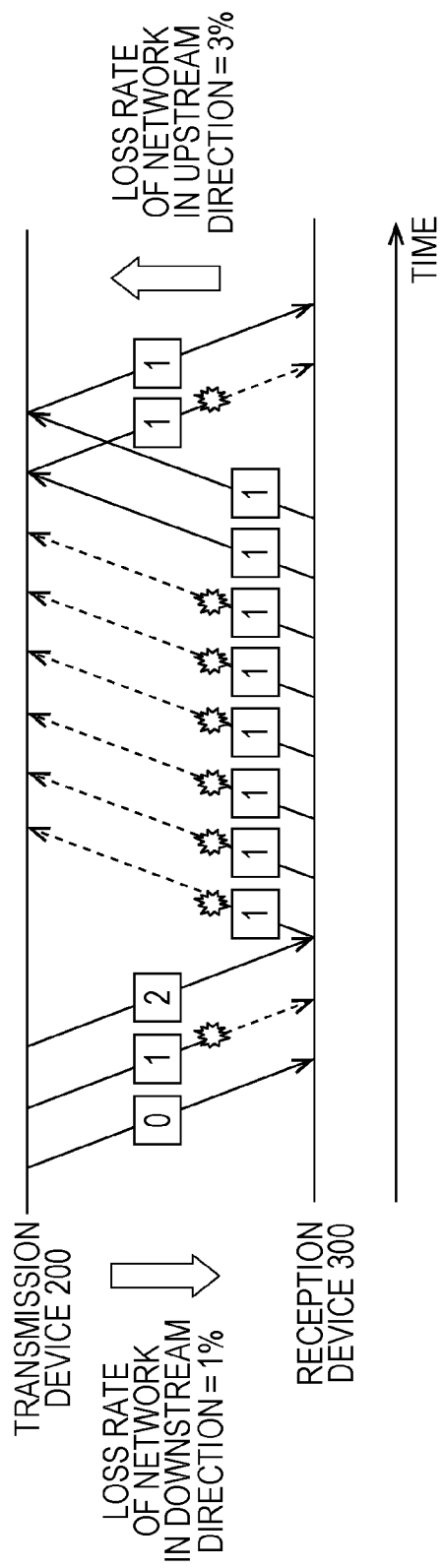

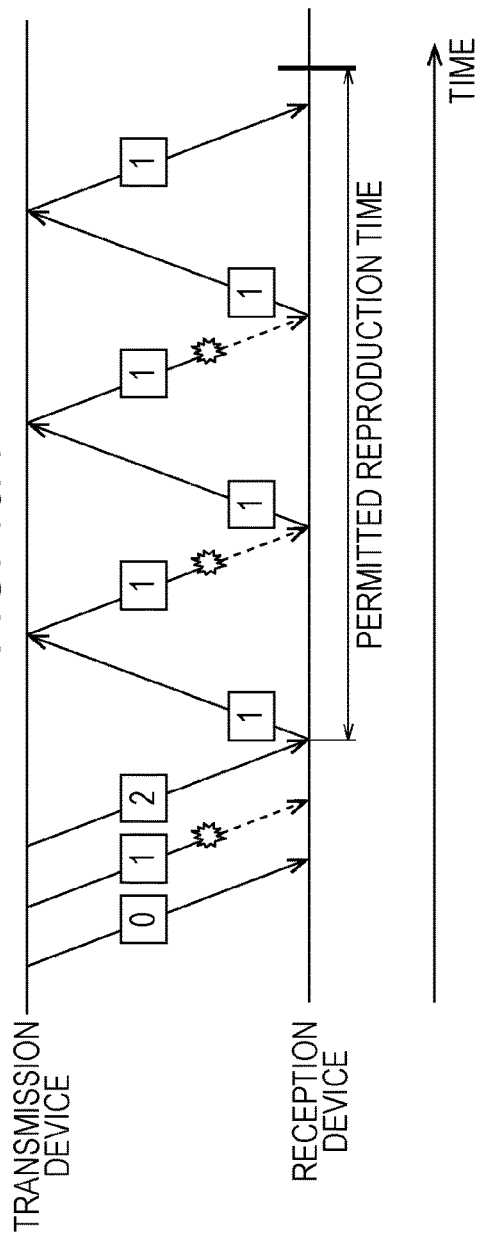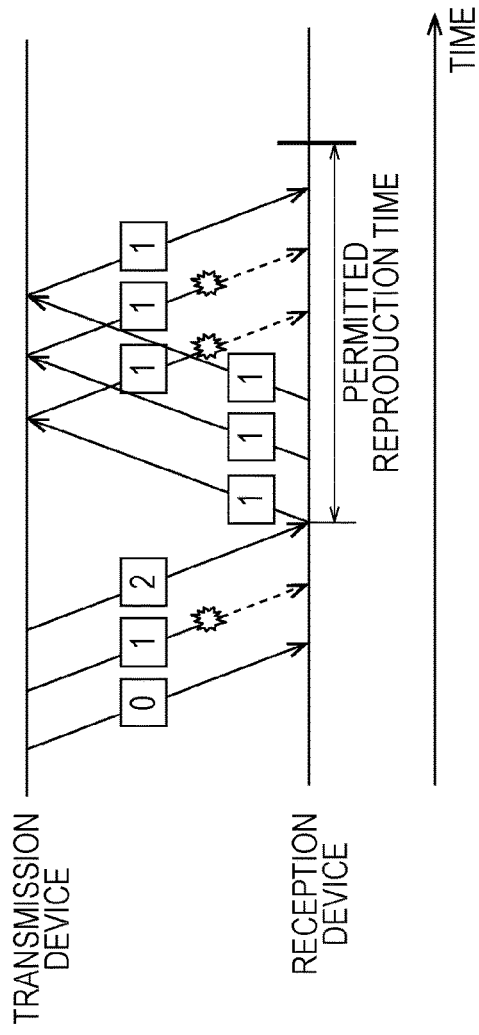

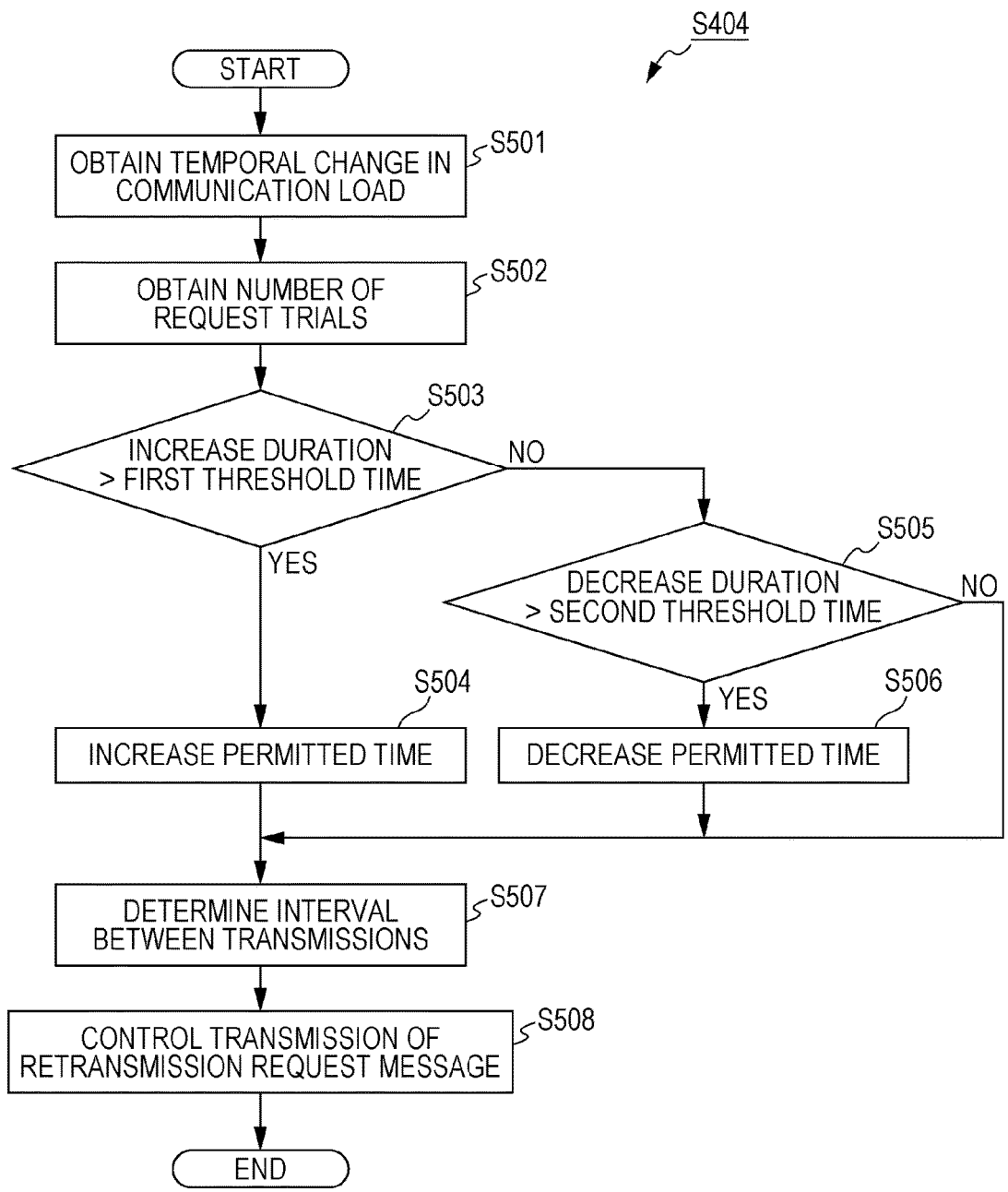

COMMUNICATION CONTROL APPARATUS, COMMUNICATION CONTROL METHOD, AND COMPUTER-READABLE NON-TRANSITORY RECORDING MEDIUM

CROSS REFERENCE TO RELATED APPLICATIONS

This patent application is a division of U.S. patent application Ser. No. 14/474,920, filed Sep. 2, 2014 that issued as U.S. Pat. No. 9,515,778 B2 on Dec. 6, 2016, which claims priority to Japanese Application No. 2013-187981, filed Sep. 11, 2013. The disclosure of these documents, including the specifications, drawings, and claims, are incorporated herein by reference in their entirety.

BACKGROUND OF THE INVENTION

1. Field of the Invention

The present disclosure relates to a communication control apparatus, a communication control method, and a computer-readable non-transitory recording medium with which recovery of data lost in the middle of a communication path is controlled.

2. Description of the Related Art

In order to recover data loss during data communication, a retransmission request message, which is a message that requests retransmission of a packet identical to a lost packet, is transmitted from a reception device to a transmission device, for example. The transmission device that has received the retransmission request message retransmits the packet identical to the lost packet to thereby recover packet loss (data loss).

However, data loss may not be appropriately recovered depending on the communication status.

SUMMARY OF THE INVENTION

One non-limiting and exemplary embodiment provides a communication control apparatus that is able to appropriately recover data loss during data communication.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: a communication control apparatus that includes a first obtaining section, a second obtaining section, and a control section. The first obtaining section is configured to obtain a first communication status indicating a frequency of occurrence of data loss during first data communication from a first communication device to a second communication device. The second obtaining section is configured to obtain a second communication status indicating a frequency of occurrence of data loss during second data communication from the second communication device to the first communication device. The control section is configured to control transmission processing relating to transmission from the second communication device to the first communication device in accordance with the first communication status and the second communication status. The transmission processing includes transmission processing of transmitting a retransmission request message that requests retransmission of data identical to lost data during the first data communication.

Note that general and specific aspects including the above-described aspect may be implemented in a form of a system, a method, an integrated circuit, a computer program, or a computer-readable recording medium, such as a compact disk read-only memory (CD-ROM), or may be implemented using any combination of a system, a method, an integrated circuit, a computer program, and a recording medium.

The communication control apparatus according to the present disclosure is able to appropriately recover data loss during data communication.

BRIEF DESCRIPTION OF THE DRAWINGS

FIG. 4 is a diagram of a configuration of a communication system according to a first embodiment.

FIG. 12 is a diagram for describing a specific example of operations performed in a communication system according to the modified example of the first embodiment.

FIG. 13A is a diagram illustrating a state where a permitted reproduction time is too long.

FIG. 13B is a diagram illustrating a state where a permitted reproduction time is too short.

FIG. 17 is a flowchart illustrating processing operations performed by the communication control apparatus according to the second embodiment.

DESCRIPTION OF THE PREFERRED EMBODIMENTS

Hereinafter, embodiments will be specifically described with reference to the drawings, however, needless detailed description may be omitted. For example, detailed description of a well-known matter or duplicated description of the substantially same configurations may be omitted in order to avoid needlessly lengthy description being given below and to facilitate understanding of those skilled in the art.

Embodiments described hereinafter indicate specific or generic examples of the present disclosure. The values, shapes, materials, constituent elements, positions and connections of the constituent elements, steps, and orders of the steps indicated in Embodiments are examples, and do not limit the present disclosure. The constituent elements in Embodiments that are not described in independent Claims that describe the most generic concept of the present disclosure are described as arbitrary constituent elements.

First Embodiment

Background Findings

Figure 1A:
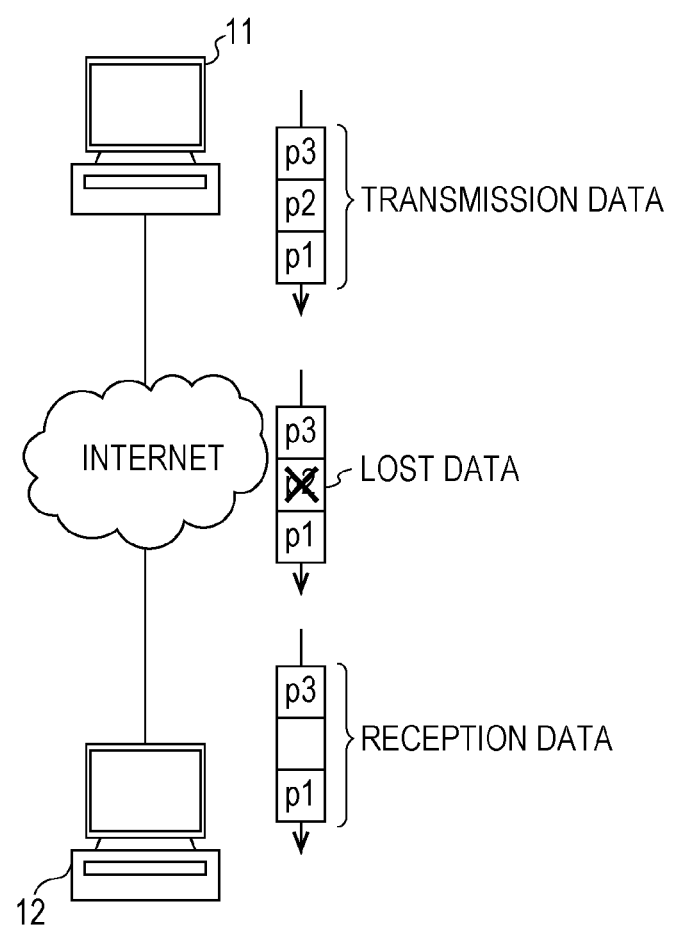
FIG. 1A is a diagram for describing data loss during data communication.

Data loss may occur on a communication path during data communication. For example, as illustrated in FIG. 1A, in the case of transmitting and receiving video and/or audio data over the Internet, loss of video and/or audio data (packet loss) may occur. In such a case, images and/or sounds reproduced by a receiver may be distorted. To prevent such distortion of images and/or sounds, ARQ has been available.

Figure 1B:
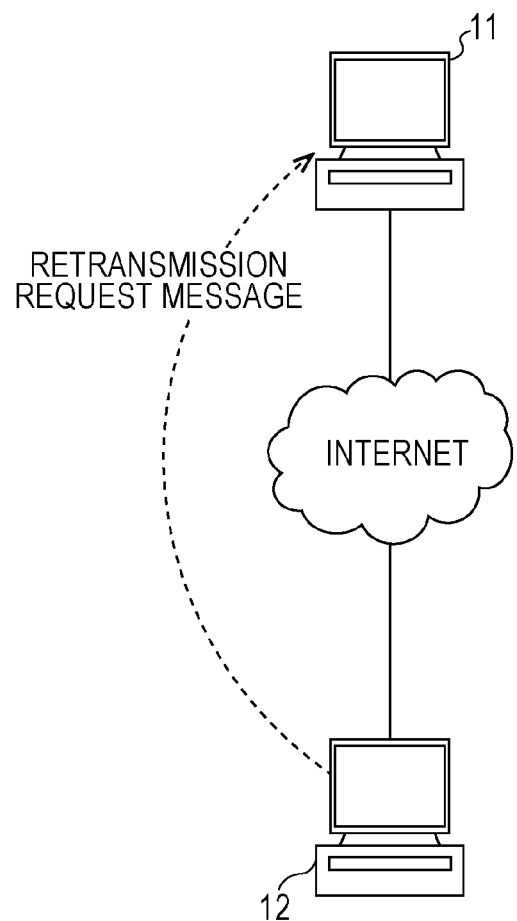
FIG. 1B is a diagram for describing automatic retransmission request (ARQ).
Figure 1C:
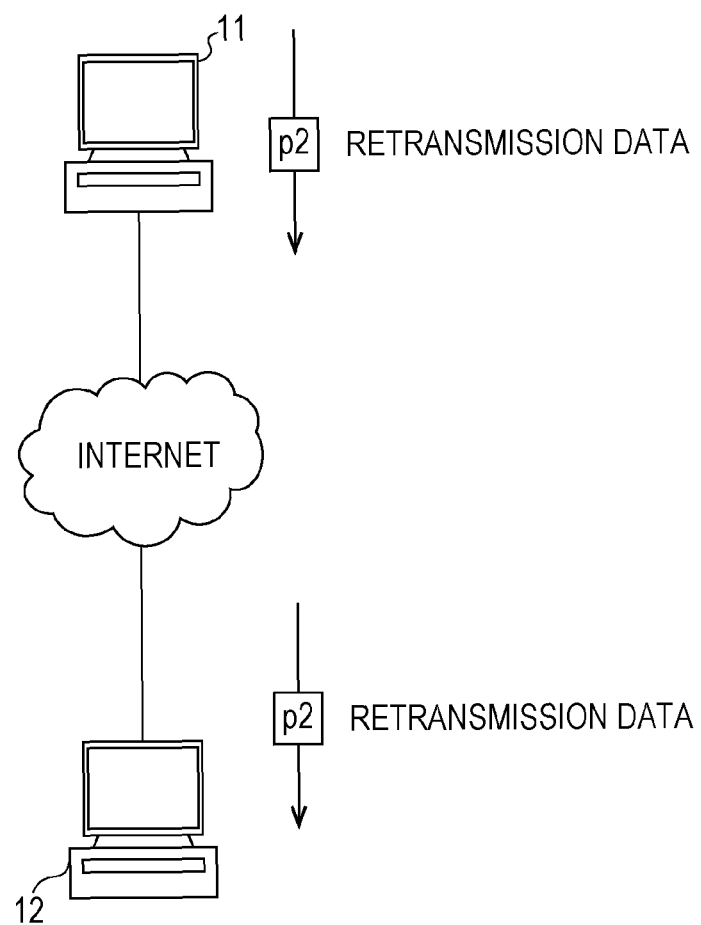
FIG. 1C is a diagram for describing ARQ.

FIGS. 1B and 1C are diagrams for describing ARQ. In ARQ, a reception device 12 requests a transmission device 11 to retransmit data identical to lost data (FIG. 1B), and the transmission device 11 retransmits the data identical to the lost data to the reception device 12 (FIG. 1C).

Figure 2A:
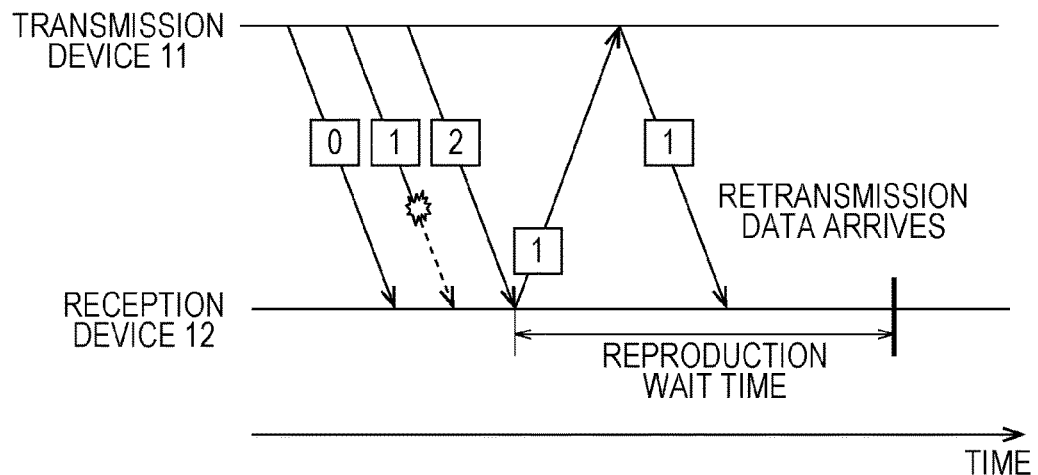
FIG. 2A is a diagram for describing retransmission of data identical to lost data.
Figure 2B:
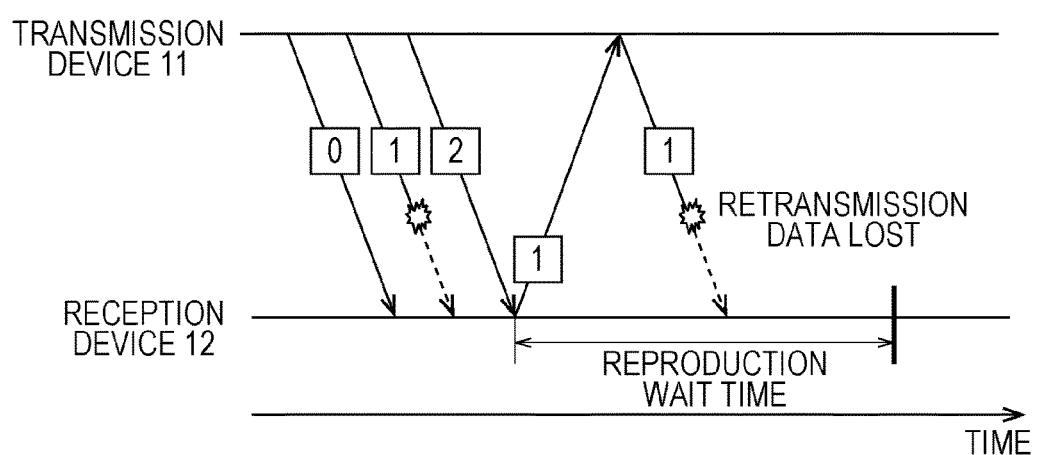
FIG. 2B is a diagram for describing retransmission of data identical to lost data.

FIGS. 2A and 2B are diagrams for describing retransmission of data identical to lost data. In FIGS. 2A and 2B, data packets respectively having the sequence numbers "0" to "2" are transmitted, and loss of the data packet having the sequence number "1" occurs. Then, a retransmission request message that requests retransmission of the data packet having the sequence number "1" is transmitted from the reception device 12 to the transmission device 11.

Figure 2C:
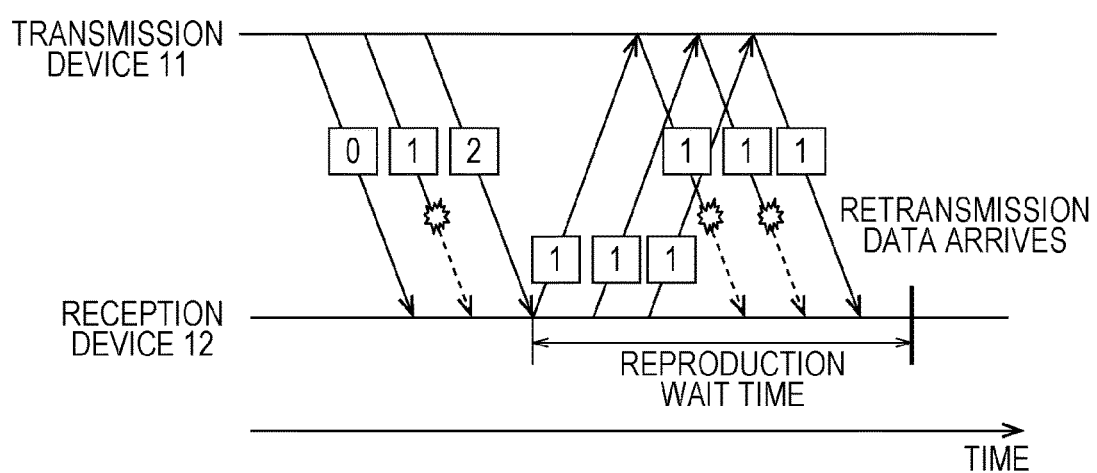
FIG. 2C is a diagram for describing a plurality of times of retransmission of data identical to lost data.

Data identical to lost data which is retransmitted in response to the retransmission request message (hereinafter referred to as "retransmission data") (i) may arrive at the reception device 12 without being lost (FIG. 2A) or (ii) may be lost again and may not arrive at the reception device 12 (FIG. 2B). Taking into consideration such loss of retransmission data, it is effective to transmit the retransmission data a plurality of times until the retransmission data arrives at the reception device 12 as illustrated in FIG. 2C.

However, in the case of transmitting retransmission data a plurality of times as described above, it is difficult to appropriately control the number of transmission trials. For example, if the number of transmission trials is too large, extra traffic is generated in the network. On the other hand, if the number of transmission trials is too small, failure of data loss recovery may occur. Accordingly, the number of retransmission trials may be adjusted so as to be appropriate for the reception status of data received from the network.

Japanese Patent No. 3871661 shows that a retransmission request is repeatedly transmitted at a retransmission request interval determined on the basis of a buffering time so that the number of repetitions does not exceed the maximum number of retransmission trials. Japanese Patent No. 4699187 shows that the number of transmission trials and the interval between transmissions of a retransmission request for achieving an inputted permitted loss rate are determined on the basis of the delay time in a receiver. Japanese Patent No. 5117512 shows that a limited number of retransmission trials of each packet is determined on the basis of a desired reception success probability that is appropriate for the characteristic of each packet (I packet, P packet, or the like).

However, any of the above-mentioned writings show that the number of retransmission trials is determined on the basis of the reception status of data in the network, which is the status of the network in the downstream direction. The status of the network in the downstream direction is the status of the network in a direction in which data (for example, video data) is received or downloaded from a transmission device to a reception device. Therefore, data loss may not be appropriately recovered depending on the status of the network in the upstream direction, which is the status of the network in a direction in which data (for example, a retransmission request message) is transmitted or uploaded to a transmission device. Such a case where data loss may not be appropriately recovered will be described with reference to FIGS. 3A to 3C.

Figure 3A:
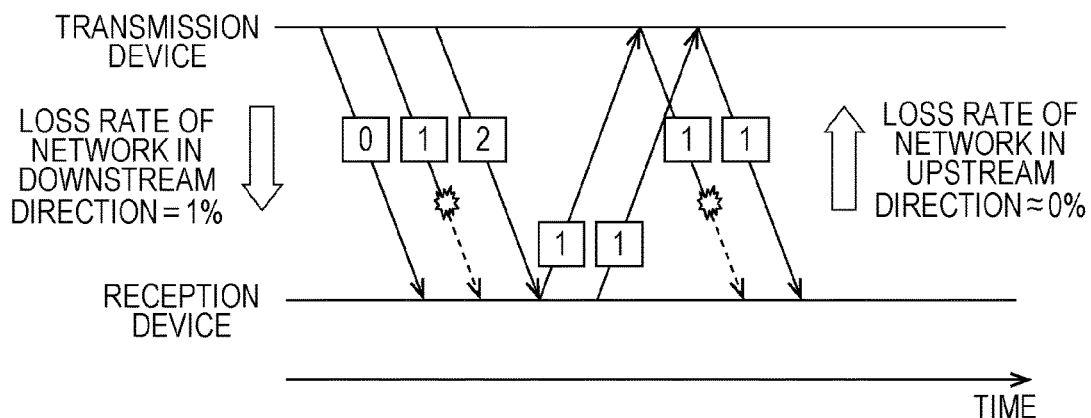
FIG. 3A is a diagram for describing data loss in the case where the loss rate of a network in the upstream direction is approximately 0%.

FIG. 3A illustrates a case where the loss rate of a network in the upstream direction is approximately 0%. Here, in order to achieve the number of retransmission trials, which is "2", calculated in accordance with the status of the network in the downstream direction, a reception device transmits two retransmission request messages. In this case, the loss rate of the network in the upstream direction is approximately 0% and therefore substantially no loss of a retransmission request message occurs. As a result, in FIG. 3A, all of the two retransmission request messages that have been transmitted arrive at a transmission device. Next, the transmission device transmits retransmission data in response to each of the retransmission request messages that have arrived. Therefore, two pieces of retransmission data are transmitted in total. Of the two pieces of retransmission data, one piece of retransmission data is lost in the network and the other piece of retransmission data eventually arrives at the reception device. As a result, data loss is recovered in FIG. 3A.

Figure 3B:
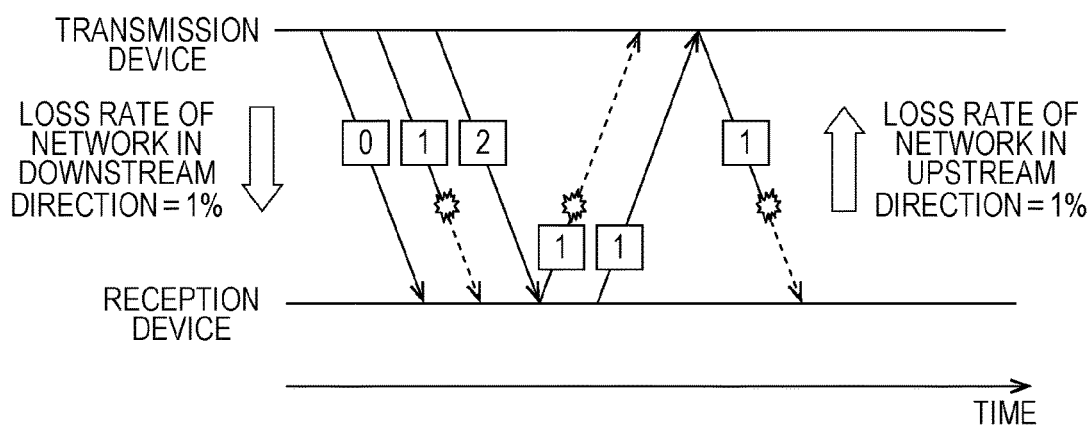
FIG. 3B is a diagram for describing data loss in the case where the loss rate of a network in the upstream direction is 1%.

FIG. 3B illustrates a case where the loss rate of a network in the upstream direction is 1%. If the loss rate of a network in the upstream direction is high to some extent, loss of a retransmission request message may occur as illustrated in FIG. 3B. As a result, a situation in which an actual number of retransmission trials made by a transmission device is less than a number of retransmission trials which is assumed by a reception device may occur. The number of retransmission trials which is assumed by the reception device is two in FIG. 3B. The actual number of retransmission trials made by the transmission device is one in FIG. 3B. In FIG. 3B, of the two retransmission request messages transmitted by the reception device, one retransmission request message is lost and therefore only one piece of retransmission data is transmitted by the transmission device. Then, the retransmission data does not arrive at the reception device, because the actual number of retransmission trials is not appropriate for the loss rate of the network in the downstream direction.

Figure 3C:
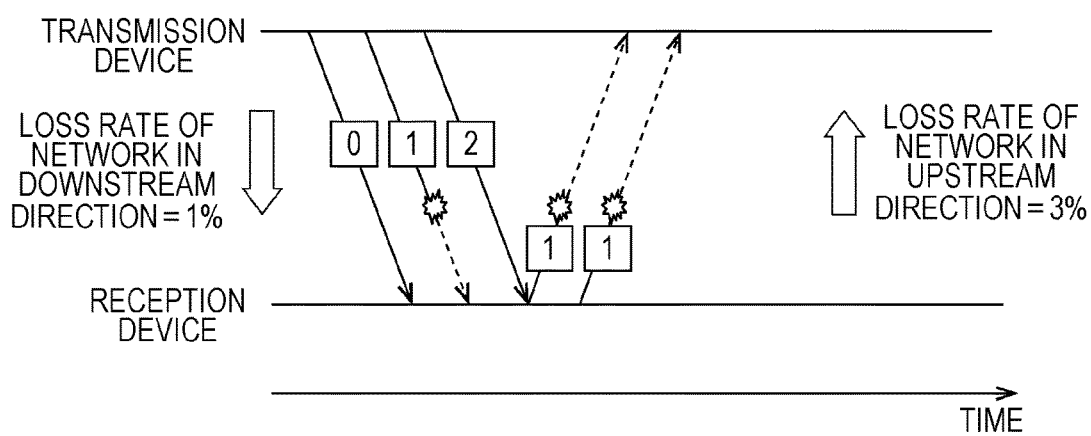
FIG. 3C is a diagram for describing data loss in the case where the loss rate of a network in the upstream direction is 3%.

FIG. 3C illustrates a case where the loss rate of a network in the upstream direction is 3%. If the loss rate of a network in the upstream direction is higher, an event may occur in which none of the retransmission request messages arrive at a transmission device and retransmission data is not transmitted at all as illustrated in FIG. 3C.

Accordingly, a communication control apparatus according to this embodiment includes a first obtaining section configured to obtain a first communication status indicating a frequency of occurrence of data loss during first data communication from a first communication device to a second communication device, a second obtaining section configured to obtain a second communication status indicating a frequency of occurrence of data loss during second data communication from the second communication device to the first communication device, and a control section configured to control transmission processing relating to transmission from the second communication device to the first communication device in accordance with the first communication status and the second communication status. The transmission processing includes transmission processing of transmitting a retransmission request message that requests retransmission of data identical to lost data during the first data communication.

According to the configuration described above, transmission processing of transmitting a retransmission request message can be controlled in accordance with both of the communication statuses, namely, the first communication status of the first data communication from the first communication device to the second communication device and the second communication status of the second data communication from the second communication device to the first communication device. Therefore, even in the case where the two communication statuses substantially differ, transmission processing of transmitting a retransmission request message can be controlled adaptively in accordance with both of the two communication statuses, and it becomes possible to appropriately recover data loss. For example, it is possible to efficiently recover packet loss relating to video and/or audio data which may occur during communication over the Internet, and the reproduction quality of images and/or sounds can be improved.

For example, the control section may include a first determination section configured to determine a number of retransmission trials of the data identical to the lost data to be retransmitted from the first communication device to the second communication device, the number of retransmission trials being appropriate for the first communication status, a second determination section configured to determine a number of request trials, which is a number of transmission trials of the retransmission request message to be transmitted from the second communication device to the first communication device, the number of request trials being appropriate for the second communication status, and a retransmission control section configured to control transmission of the retransmission request message that contains information specifying the number of retransmission trials, in accordance with the number of request trials.

According to the configuration described above, the number of retransmission trials of data identical to lost data can be determined, the number of retransmission trials being appropriate for the first communication status, and the number of transmission trials of a retransmission request message (the number of request trials) can be determined, the number of transmission trials being appropriate for the second communication status. Therefore, the number of retransmission trials of data identical to lost data and the number of transmission trials of a retransmission request message can be determined appropriately in accordance with the communication statuses. Furthermore, information specifying the number of retransmission trials is contained in a retransmission request message and therefore the number of retransmission trials can be controlled independently of the number of times a retransmission request message arrives at the first communication device. Accordingly, the number of retransmission trials can be appropriately controlled and it becomes possible to appropriately recover data loss during the data communication.

For example, the first data communication may be packet communication, the first communication status may include a first packet loss rate in the first data communication, and the first determination section may determine the number of retransmission trials such that the number of retransmission trials becomes larger as the first packet loss rate increases.

According to the configuration described above, the number of retransmission trials can be determined in accordance with the packet loss rate, and it becomes possible to appropriately recover packet loss during the packet communication.

For example, in a case where the number of retransmission trials is denoted by K1, the first packet loss rate is denoted by LR1, and a target value of a probability of the retransmitted data identical to the lost data arriving at the second communication device at least once is denoted by $\alpha1$, an expression, $1-(LR1)^{K1} \geq \alpha1$, may be satisfied.

According to the configuration described above, the number of retransmission trials can be determined so as to satisfy the target value of the probability of retransmitted data identical to lost data arriving at the second communication device at least once, and it becomes possible to appropriately recover packet loss during the packet communication.

For example, the second data communication may be packet communication, the second communication status may include a second packet loss rate in the second data communication, and the second determination section may determine the number of request trials such that the number of request trials becomes larger as the second packet loss rate increases.

According to the configuration described above, the number of request trials can be determined in accordance with the packet loss rate, and it becomes possible to appropriately recover packet loss during the packet communication.

For example, in a case where the number of request trials is denoted by K2, the second packet loss rate is denoted by LR2, and a target value of a probability of the retransmission request message arriving at the first communication device at least once is denoted by $\alpha2$, an expression, $1-(LR2)^{K2} \geq \alpha2$, may be satisfied.

According to the configuration described above, the number of request trials can be determined so as to satisfy the target value of the probability of a retransmission request message arriving at the first communication device at least once, and it becomes possible to appropriately recover packet loss during the packet communication.

For example, the control section may determine a number of request trials, which is a number of transmission trials of the retransmission request message to be transmitted from the second communication device to the first communication device, the number of request trials being appropriate for the first communication status and the second communication status, and may control transmission of the retransmission request message in accordance with the number of request trials.

According to the configuration described above, the number of transmission trials of a retransmission request message (the number of request trials) can be determined in accordance with both of the first communication status and the second communication status. That is, the number of request trials that is appropriate for both of the first communication status and the second communication status can be determined. Therefore, the first communication device can retransmit data identical to lost data each time a retransmission request message arrives, and it becomes possible to control the number of retransmission trials with a simple configuration.

For example, the control section may include a first determination section configured to determine a number of retransmission trials of the data identical to the lost data to be retransmitted from the first communication device to the second communication device, the number of retransmission trials being appropriate for the first communication status, and a second determination section configured to determine the number of request trials in accordance with the second communication status and the number of retransmission trials so that a number of times the retransmission request message arrives at the first communication device is equal to the number of retransmission trials.

According to the configuration described above, the number of retransmission trials can be determined in accordance with the first communication status, and the number of request trials can be determined in accordance with the number of retransmission trials and the second communication status.

For example, the second determination section may determine a first number of request trials, which is a number of transmission trials needed for the retransmission request message to arrive at the first communication device at least once, in accordance with the second communication status, and may determine a second number of request trials, which is the number of request trials, by multiplying the first number of request trials by the number of retransmission trials.

According to the configuration described above, the first number of request trials can be determined in accordance with the second communication status, and the number of transmission trials of a retransmission request message (the second number of request trials) can be determined by multiplying the first number of request trials by the number of retransmission trials.

For example, the second communication status may be measured by using a control message that is transmitted from the second communication device to the first communication device and that is used to measure the second communication status.

According to the configuration described above, the second communication status is measured by using a control message used to measure the second communication status and therefore it becomes possible to obtain the accurate second communication status. Accordingly, it becomes possible to appropriately recover data loss in the data communication.

Note that these general and specific aspects of the present disclosure may be implemented in a form of a system, a method, an integrated circuit, a computer program, or a computer-readable recording medium, such as a CD-ROM, or may be implemented using any combination of a system, a method, an integrated circuit, a computer program, and a recording medium.

Hereinafter, an example of a communication system including a communication control apparatus according to this embodiment will be specifically described.

Configuration

Configuration of Communication System

FIG. 4 illustrates a configuration of a communication system according to the first embodiment. FIG. 4 illustrates a remote display system in which video and/or audio data are transmitted and received as an example of the communication system. The remote display system includes an input device 100, a transmission device 200, a reception device 300 that includes a communication control apparatus 310, and an output device 400.

The input device 100 transmits video and/or audio data to the transmission device 200. The input device 100 is, for example, a digital video camera, a digital still camera, a voice recorder, a smartphone, or a tablet computer.

The transmission device 200 is an example of the first communication device. Specifically, the transmission device 200 is, for example, a personal computer, a smartphone, a tablet computer, or a communication adapter. The transmission device 200 transmits video and/or audio data to the reception device 300 over the Internet.

The reception device 300 is an example of the second communication device. Specifically, the reception device 300 is, for example, a personal computer, a set top box, a disc player or a recorder, or a communication adapter. The reception device 300 outputs video and/or audio signals obtained by reproducing video and/or audio data received from the transmission device 200 to the output device 400.

The output device 400 outputs images, sounds, or both images and sounds on the basis of video and/or audio signals. The output device 400 is, for example, a television, a personal computer, a smartphone, or a tablet computer.

Hereinafter, data communication from the transmission device 200 to the reception device 300 is called the first data communication. Data communication from the reception device 300 to the transmission device 200 is called the second data communication.

Next, configurations of the transmission device 200 and the reception device 300 in this embodiment will be described in further detail.

Configuration of Transmission Device

The transmission device 200 includes a transmission section 201, a reception section 202, a retransmission control section 203, a measurement section 204, and a notification section 205.

The transmission section 201 transmits video and/or audio data obtained from the input device 100 to the reception device 300 over the Internet. Specifically, the transmission section 201 first transmits video and/or audio data (original data). The transmission section 201 transmits video and/or audio data (retransmission data) according to an instruction given by the retransmission control section 203.

The reception section 202 receives a retransmission request message from the reception device 300. Then, the reception section 202 communicates the retransmission request message to the retransmission control section 203. The retransmission request message is a message for the reception device 300 to request retransmission of data identical to lost data.

The reception section 202 communicates information used to measure the second communication status to the measurement section 204. The second communication status indicates the frequency of occurrence of data loss during the second data communication from the reception device 300 to the transmission device 200. For example, the second communication status may include the packet loss rate in communication of packetized data (hereinafter referred to as "packet communication") from the reception device 300 to the transmission device 200 (hereinafter referred to as the "second packet loss rate"). In this case, the reception section 202 may communicate the sequence numbers of a plurality of packets received from the reception device 300 to the measurement section 204 as information used to measure the second communication status.

Note that the reception section 202 may receive a control message (for example, a message transmitted from the reception device 300 to the transmission device 200 in order to measure the second communication status), which is different from the retransmission request message. In this case, the reception section 202 may communicate the sequence numbers of a plurality packetized control messages to the measurement section 204 as information used to measure the second communication status. That is, in this case, the second communication status is measured by using control messages. The control messages are transmitted from the reception device 300 to the transmission device 200 and used to measure the second communication status.

In the case where a retransmission request message has been received, the retransmission control section 203 retransmits, to the reception device 300 via the transmission section 201, data identical to data lost (lost data) during data communication from the transmission device 200 to the reception device 300 (first data communication). For example, the retransmission control section 203 retransmits a packet corresponding to the lost data among a plurality of packets retained in the transmission section 201 or a buffer memory (not illustrated).

Note that, in this embodiment, the retransmission control section 203 retransmits, to the reception device 300 via the transmission section 201, the data identical to the lost data a number of times equal to the number of retransmission trials specified by information contained in the retransmission request message.

The measurement section 204 measures the second communication status. Specifically, the measurement section 204 calculates the number of lost packets on the basis of the order of the sequence numbers of a plurality of packets that have arrived from the reception device 300, for example. Then, the measurement section 204 measures the second communication status by using the ratio of the number of lost packets to the total number of packets (the sum of the number of lost packets and the number of arrived packets) as the second measurement status, for example. Hereinafter, the ratio of the number of lost packets to the total number of packets is referred to as the "packet loss rate".

The notification section 205 communicates the second communication status measured by the measurement section 204 to the reception device 300. That is, the notification section 205 transmits a message indicating the second communication status to the reception device 300.

Configuration of Reception Device

The reception device 300 includes a reception section 301, a measurement section 302, a transmission section 303, and the communication control apparatus 310.

The reception section 301 receives video and/or audio data from the transmission device 200. The reception section 301 transmits video and/or audio signals obtained by reproducing the received video and/or audio data to the output device 400. For example, the reception section 301 generates video and/or audio signals by decoding coded video and/or audio data and transmits the generated video and/or audio signals to the output device 400.

The reception section 301 communicates information used to measure the first communication status to the measurement section 302. The first communication status indicates the frequency of occurrence of data loss during the first data communication from the transmission device 200 to the reception device 300. For example, in the case where the first data communication is packet communication, the first communication status may include the packet loss rate in packet communication from the transmission device 200 to the reception device 300 (hereinafter referred to as the "first packet loss rate"). In this case, the reception section 301 communicates the sequence numbers of a plurality of packets received from the transmission device 200 to the measurement section 302 as information used to measure the first communication status.

The measurement section 302 measures the first communication status. Specifically, the measurement section 302 calculates the number of lost packets on the basis of the order of the sequence numbers of a plurality of packets that have arrived from the transmission device 200, for example. Then, the measurement section 302 measures the first communication status by using the ratio (packet loss rate) of the number of lost packets to the total number of packets (the sum of the number of lost packets and the number of arrived packets) as the first measurement status, for example.

The transmission section 303 transmits a retransmission request message according to an instruction given by the communication control apparatus 310. For example, the transmission section 303 transmits a retransmission request message generated by the communication control apparatus 310. Specifically, the transmission section 303 repeatedly transmits a retransmission request message at a predetermined regular interval until the number of repetitions reaches the number of request trials, for example. The transmission section 303 may repeatedly transmit a retransmission request message at a time interval specified by the communication control apparatus 310 until the number of repetitions reaches the number of request trials, for example.

The transmission section 303 may transmit to the transmission device 200 a control message used by the transmission device 200 to measure the second communication status. For example, the transmission section 303 may repeatedly transmit a control message at a certain time interval.

The communication control apparatus 310 controls recovery of data loss during the first data communication. Specifically, the communication control apparatus 310 controls transmission processing of transmitting, from the reception device 300 to the transmission device 200, a retransmission request message that requests retransmission of data identical to lost data during the first data communication. Transmission processing of transmitting a retransmission request message is processing relating to transmission of a retransmission request message. For example, transmission processing of transmitting a retransmission request message may include processing of determining the content of a retransmission request message or processing of generating a retransmission request message. The detailed configuration of the communication control apparatus 310 will be described below.

Configuration of Communication Control Apparatus

Figure 5:
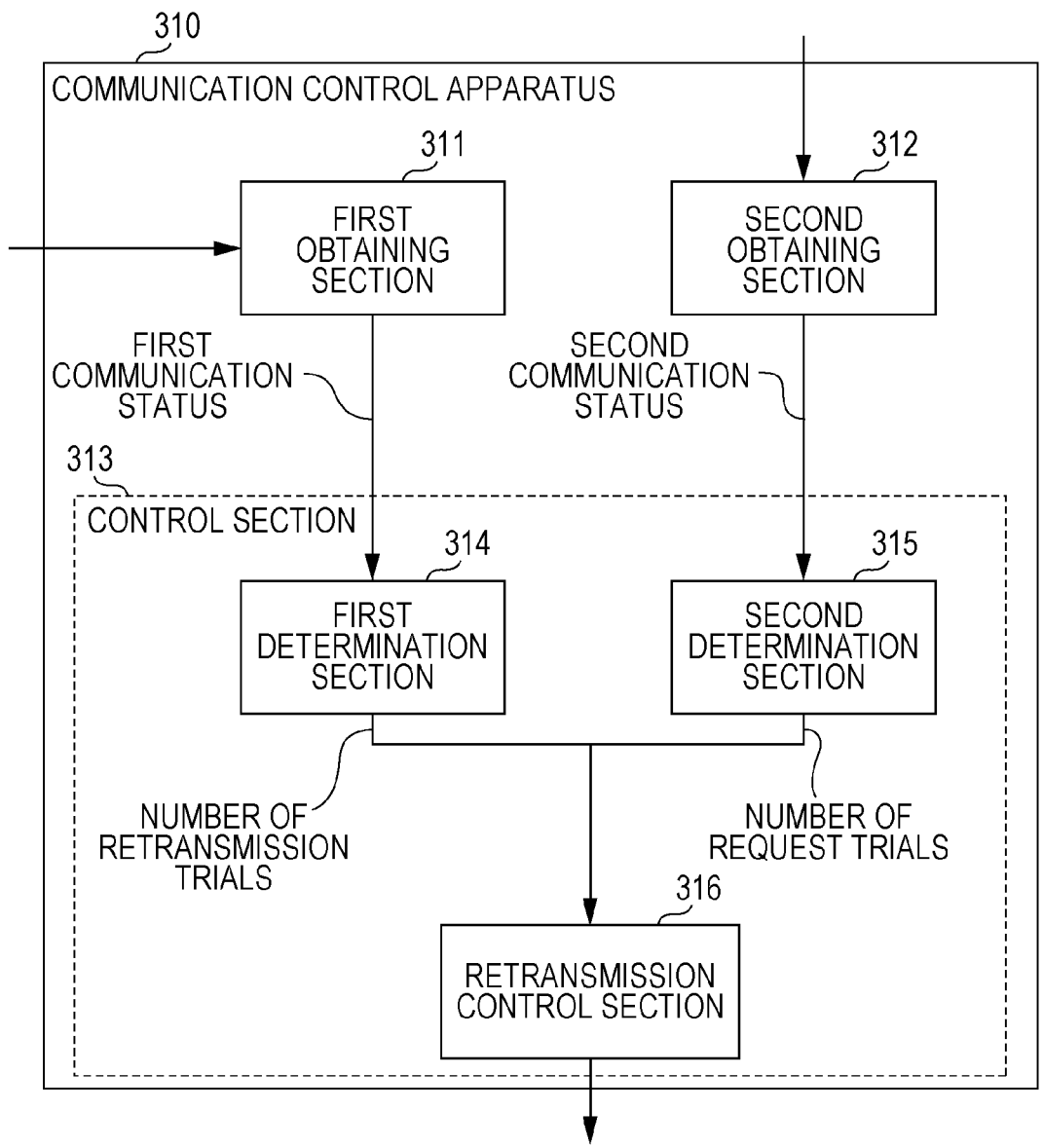
FIG. 5 is a block diagram illustrating a configuration of a communication control apparatus according to the first embodiment.

FIG. 5 illustrates a configuration of the communication control apparatus 310 according to the first embodiment.

The communication control apparatus 310 includes a first obtaining section 311, a second obtaining section 312, and a control section 313.

The first obtaining section 311 obtains the first communication status. In this embodiment, the first obtaining section 311 obtains the first communication status from the measurement section 302 of the reception device 300.

The second obtaining section 312 obtains the second communication status. In this embodiment, the second obtaining section 312 obtains the second communication status from the notification section 205 of the transmission device 200.

The control section 313 controls transmission processing of transmitting, from the reception device 300 to the transmission device 200, a retransmission request message that requests retransmission of data identical to lost data during the first data communication, on the basis of the first communication status obtained by the first obtaining section 311 and the second communication status obtained by the second obtaining section 312. In this embodiment, the control section 313 controls (i) information to be contained in a retransmission request message and (ii) the number of transmission trials of the retransmission request message.

As illustrated in FIG. 5, the control section 313 includes a first determination section 314, a second determination section 315, and a retransmission control section 316, for example.

The first determination section 314 determines the number of retransmission trials of data identical to lost data from the transmission device 200 to the reception device 300, the number of retransmission trials being appropriate for the first communication status. For example, the first determination section 314 determines the number of retransmission trials such that the number of retransmission trials becomes larger as the frequency of data loss indicated by the first communication status increases. Specifically, in the case where the first data communication is packet communication and the first communication status includes the first packet loss rate, for example, the first determination section 314 determines the number of retransmission trials such that the number of retransmission trials becomes larger as the first packet loss rate increases.

The second determination section 315 determines the number of request trials, which is the number of transmission trials of a retransmission request message from the reception device 300 to the transmission device 200, the number of request trials being appropriate for the second communication status. For example, the second determination section 315 determines the number of request trials such that the number of request trials becomes larger as the frequency of data loss indicated by the second communication status increases. Specifically, in the case where the second data communication is packet communication and the second communication status includes the second packet loss rate, for example, the second determination section 315 determines the number of request trials such that the number of request trials becomes larger as the second packet loss rate increases.

The retransmission control section 316 controls transmission of a retransmission request message to the transmission device 200 in accordance with the number of request trials determined by the second determination section 315, the retransmission request message containing information specifying the number of retransmission trials determined by the first determination section 314. Here, the retransmission control section 316 repeatedly transmits, to the transmission device 200 via the transmission section 303, a retransmission request message until the retransmitted data identical to the lost data is received, while assuming that the number of request trials is the upper limit of the number of repetitions.

Specifically, the retransmission control section 316 generates a retransmission request message that contains information specifying the number of retransmission trials, for example. Then, the retransmission control section 316 communicates the retransmission request message to the transmission section 303 in accordance with the number of request trials to thereby make the transmission section 303 transmit the retransmission request message.

For example, the retransmission control section 316 may communicate the number of request trials and the number of retransmission trials to the transmission section 303. In this case, the transmission section 303 may generate a retransmission request message that contains information specifying the number of retransmission trials. Then, the transmission section 303 may transmit the retransmission request message to the transmission device 200 in accordance with the number of request trials.

Operations

Next, operations performed in the communication system configured as described above will be described with reference to the drawings.

Operations Performed by Reception Device

Figure 6:
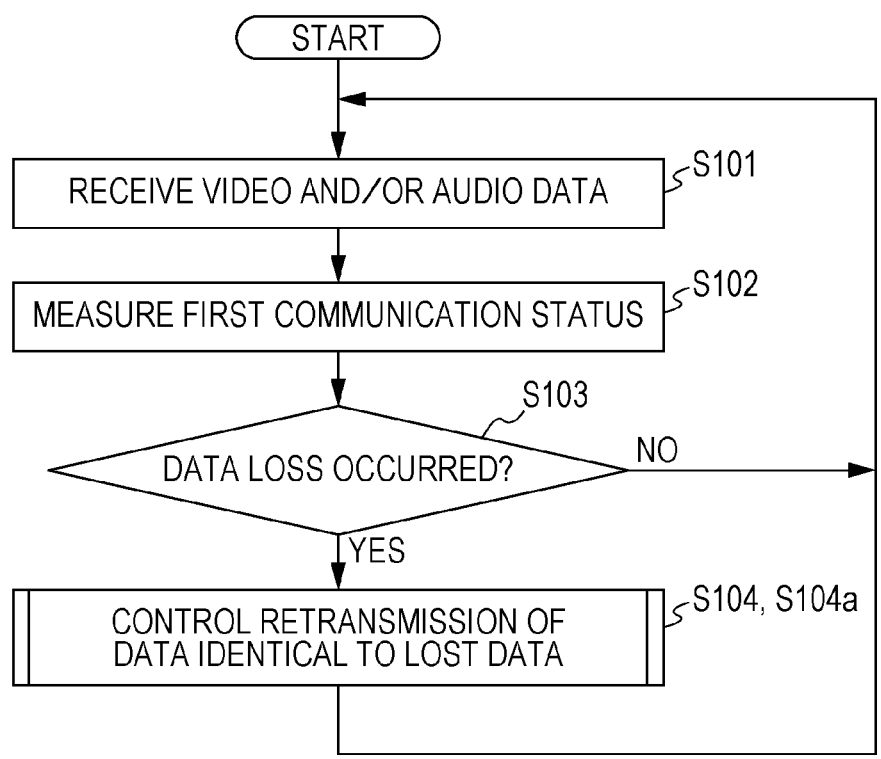
FIG. 6 is a flowchart illustrating processing operations performed by a reception device according to the first embodiment.

FIG. 6 is a flowchart illustrating processing operations performed by the reception device 300 according to the first embodiment.

First, the reception section 301 receives video and/or audio data from the transmission device 200 (step S101). The measurement section 302 measures the first communication status (step S102), and determines whether or not data loss has occurred (step S103).

If data loss has not occurred (No in step S103), the flow returns to step S101. For example, in the case where the measurement section 302 has not detected loss of video and/or audio data, the measurement section 302 keeps measuring the first communication status.

On the other hand, if data loss has occurred (Yes in step S103), the communication control apparatus 310 controls retransmission of data identical to the lost data (step S104), and the flow returns to step S101. For example, in the case where the measurement section 302 has detected loss of video and/or audio data, the communication control apparatus 310 performs processing for controlling retransmission of data identical to the lost data. Operations performed by the communication control apparatus 310 in step S104 will be described with reference to FIG. 7.

Operations Performed by Communication Control Apparatus

Figure 7:
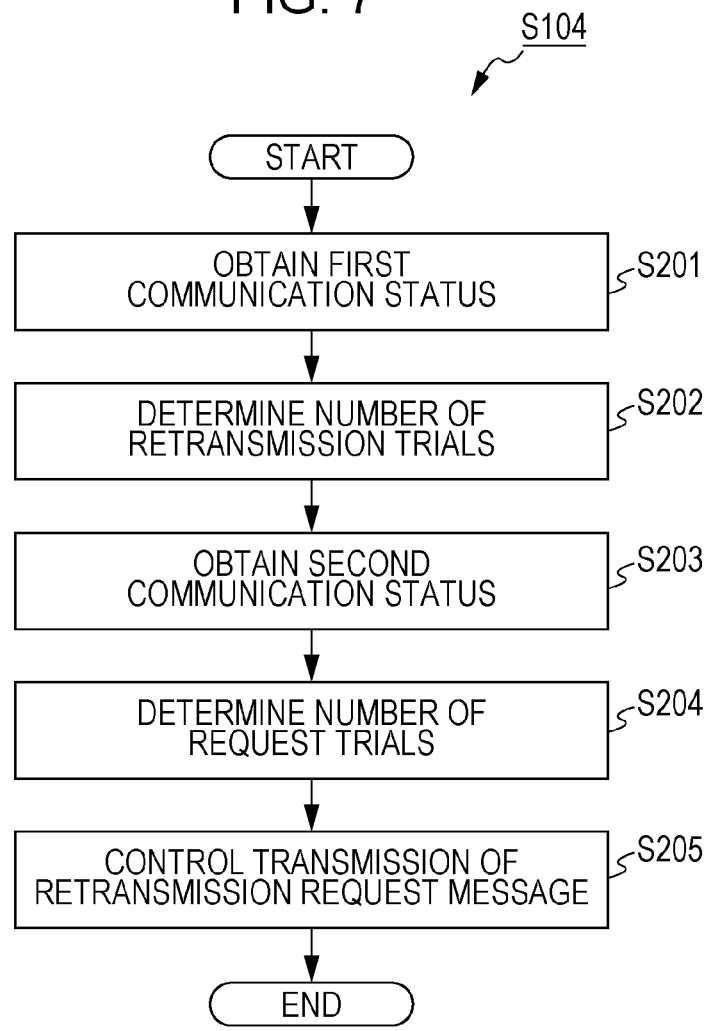
FIG. 7 is a flowchart illustrating processing operations performed by the communication control apparatus according to the first embodiment.

FIG. 7 is a flowchart illustrating processing operations performed by the communication control apparatus 310 according to the first embodiment. That is, FIG. 7 illustrates the details of step S104 in FIG. 6.

First, the first obtaining section 311 obtains the first communication status (step S201). The obtained first communication status is inputted to the first determination section 314.

Next, the first determination section 314 determines the number of retransmission trials of the data identical to the lost data in accordance with the first communication status (step S202). The determined number of retransmission trials is inputted to the retransmission control section 316.

The second obtaining section 312 obtains the second communication status (step S203). The obtained second communication status is inputted to the second determination section 315.

The second determination section 315 determines the number of transmission trials of a retransmission request message (the number of request trials) in accordance with the second communication status (step S204). The determined number of request trials is inputted to the retransmission control section 316.

The retransmission control section 316 controls transmission of a retransmission request message containing information specifying the number of retransmission trials in accordance with the number of request trials (step S205).

Here, a specific example of processing performed in order to determine the number of retransmission trials in step S202 and to determine the number of request trials in step S204 will be described. In the specific example, both of the first data communication and the second data communication are packet communication, and both data identical to lost data and a retransmission request message are packetized. Hereinafter, packetized data identical to lost data is called a packet identical to a lost packet, and a packetized retransmission request message is called a retransmission request packet.

In the specific example, the first communication status includes a first packet loss rate LR1. The second communication status includes a second packet loss rate LR2.

First, a method of calculating the number of retransmission trials K1 needed for a retransmitted packet identical to a lost packet to arrive at the reception device 300 at least once will be described. The first packet loss rate LR1 is the probability of loss of a packet when the packet is transmitted from the transmission device 200 to the reception device 300 once. Therefore, in the case where a packet is transmitted K1 times, the probability of loss of the packet in all cases is expressed by $(LR1)^{K1}$. Accordingly, the first determination section 314 calculates the number of retransmission trials K1 so as to satisfy expression (1) below. More specifically, the first determination section 314 calculates the minimum value of the number of retransmission trials K1 that satisfies expression (1) below. As a result, the number of retransmission trials K1 needed for a retransmitted packet identical to a lost packet to arrive at the reception device 300 at least once is calculated.

$$1-(LR1)^{K1} \geq \alpha 1 \qquad (1)$$

Here, α1 is a target value of the probability (transmission success rate) of a retransmitted packet identical to a lost packet arriving at the reception device 300 at least once. α1 may be a predetermined value (for example, "0.999"). Alternatively, α1 may be determined adaptively in accordance with the importance of the lost packet.

Next, a method of calculating the number of request trials K2 needed for a retransmission request packet to arrive at the transmission device 200 at least once will be described. The second packet loss rate LR2 is the probability of loss of a packet when the packet is transmitted from the reception device 300 to the transmission device 200 once. Therefore, in the case where a packet is transmitted K2 times, the probability of loss of the packet in all cases is expressed by $(LR2)^{K2}$. Accordingly, the second determination section 315 calculates the number of request trials K2 so as to satisfy expression (2) below. More specifically, the second determination section 315 calculates the minimum value of the number of request trials K2 that satisfies expression (2) below. As a result, the number of request trials K2 needed for a retransmission request packet to arrive at the transmission device 200 at least once is calculated.

$$1-(LR2)^{K2} \geq \alpha 2 \qquad (2)$$

Here, α2 is a target value of the probability (transmission success rate) of a retransmission request packet arriving at the transmission device 200 at least once. α2 may be a predetermined value (for example, "0.999"). Alternatively, α2 may be determined adaptively in accordance with the importance of the lost packet.

Operations Performed by Transmission Device

Figure 8:
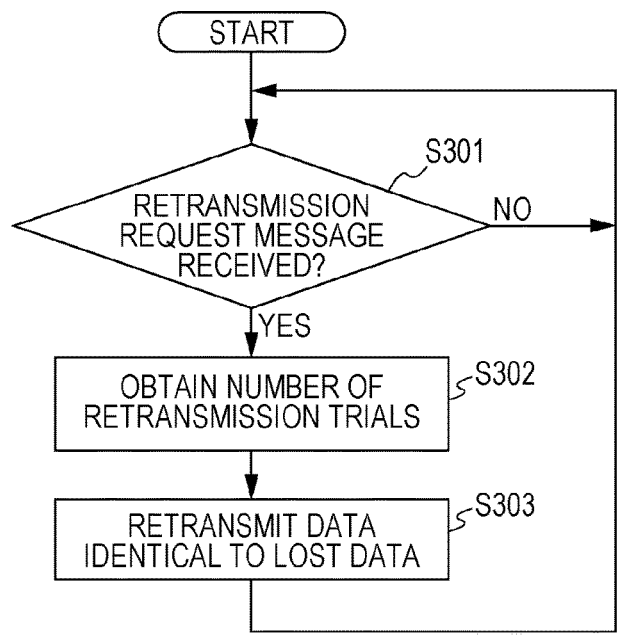
FIG. 8 is a flowchart illustrating processing operations performed by a transmission device according to the first embodiment.

Next, operations performed by the transmission device 200 in the case where a retransmission request message is received will be described. FIG. 8 is a flowchart illustrating processing operations performed by the transmission device 200 according to the first embodiment.

First, the retransmission control section 203 determines whether or not a retransmission request message has been received (step S301). If a retransmission request message has not been received (No in step S301), determination as to whether or not a retransmission request message has been received is repeatedly performed.

On the other hand, if a retransmission request message has been received (Yes in step S301), the retransmission control section 203 obtains the number of retransmission trials from the retransmission request message (step S302). The retransmission control section 203 retransmits data identical to lost data specified by the retransmission request message a number of times equal to the number of retransmission trials (step S303).

Specific Example of Operations Performed in Communication System

Figure 9:
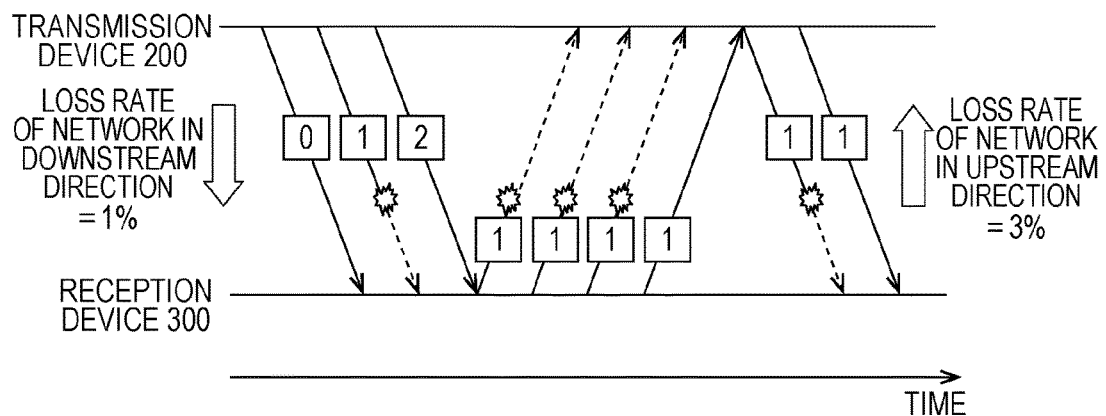
FIG. 9 is a diagram for describing a specific example of operations performed in the communication system according to the first embodiment.

Next, a specific example of operations performed in the communication system according to this embodiment as described above will be described. FIG. 9 is a diagram for describing a specific example of operations performed in the communication system according to the first embodiment.

In FIG. 9, data packets respectively having the sequence numbers "0" to "2" are transmitted and loss of the data packet having the sequence number "1" occurs. Then, the communication control apparatus 310 of the reception device 300 determines the number of retransmission trials and the number of request trials.

Specifically, the first determination section 314 determines the number of retransmission trials to be "2" in accordance with the first packet loss rate of "1%" in the first data communication. The second determination section 315 determines the number of request trials to be "4" in accordance with the second packet loss rate of "3%" in the second data communication. As a result, a retransmission request packet is transmitted four times. The retransmission request packet contains (i) information used to request retransmission of the data packet having the sequence number "1" and (ii) information specifying that the number of retransmission trials is "2". The retransmission request packet arrives at the transmission device 200 only once.

The retransmission control section 203 of the transmission device 200 obtains the number of retransmission trials "2" from the retransmission request packet. The retransmission control section 203 transmits the data packet (lost packet) having the sequence number "1" via the transmission section 201 twice. As a result, the retransmitted packet identical to the lost packet arrives at the reception device 300 once.

Effects

As described above, the communication control apparatus 310 according to this embodiment is able to control transmission processing of transmitting a retransmission request message in accordance with both of the communication statuses, namely, the first communication status of the first data communication from the transmission device 200 to the reception device 300 and the second communication status of the second data communication from the reception device 300 to the transmission device 200. Therefore, even in the case where the two communication statuses substantially differ, transmission processing of transmitting a retransmission request message can be controlled adaptively in accordance with both of the two communication statuses, and it becomes possible to appropriately recover data loss.

The first determination section 314 is able to determine the number of retransmission trials of data identical to lost data, the number of retransmission trials being appropriate for the first communication status, and the second determination section 315 is able to determine the number of transmission trials of a retransmission request message (the number of request trials), the number of transmission trials being appropriate for the second communication status. Therefore, the communication control apparatus 310 is able to determine the number of retransmission trials of data identical to lost data and the number of transmission trials of a retransmission request message appropriately in accordance with the communication statuses. Furthermore, information specifying the number of retransmission trials is contained in a retransmission request message and therefore it becomes possible to control the number of retransmission trials independently of the number of times a retransmission request message arrives at the transmission device 200. Therefore, the number of retransmission trials can be appropriately controlled, and it becomes possible to appropriately recover data loss during data communication.

Modified Example

Next, a modified example of the first embodiment will be described. In this modified example, the method of determining the number of request trials is different from that in the first embodiment. Consequently, in this modified example, a retransmission request message need not contain information specifying the number of retransmission trials. Note that description of configurations and processing similar to those in the first embodiment will be omitted hereinafter.

Figure 10:
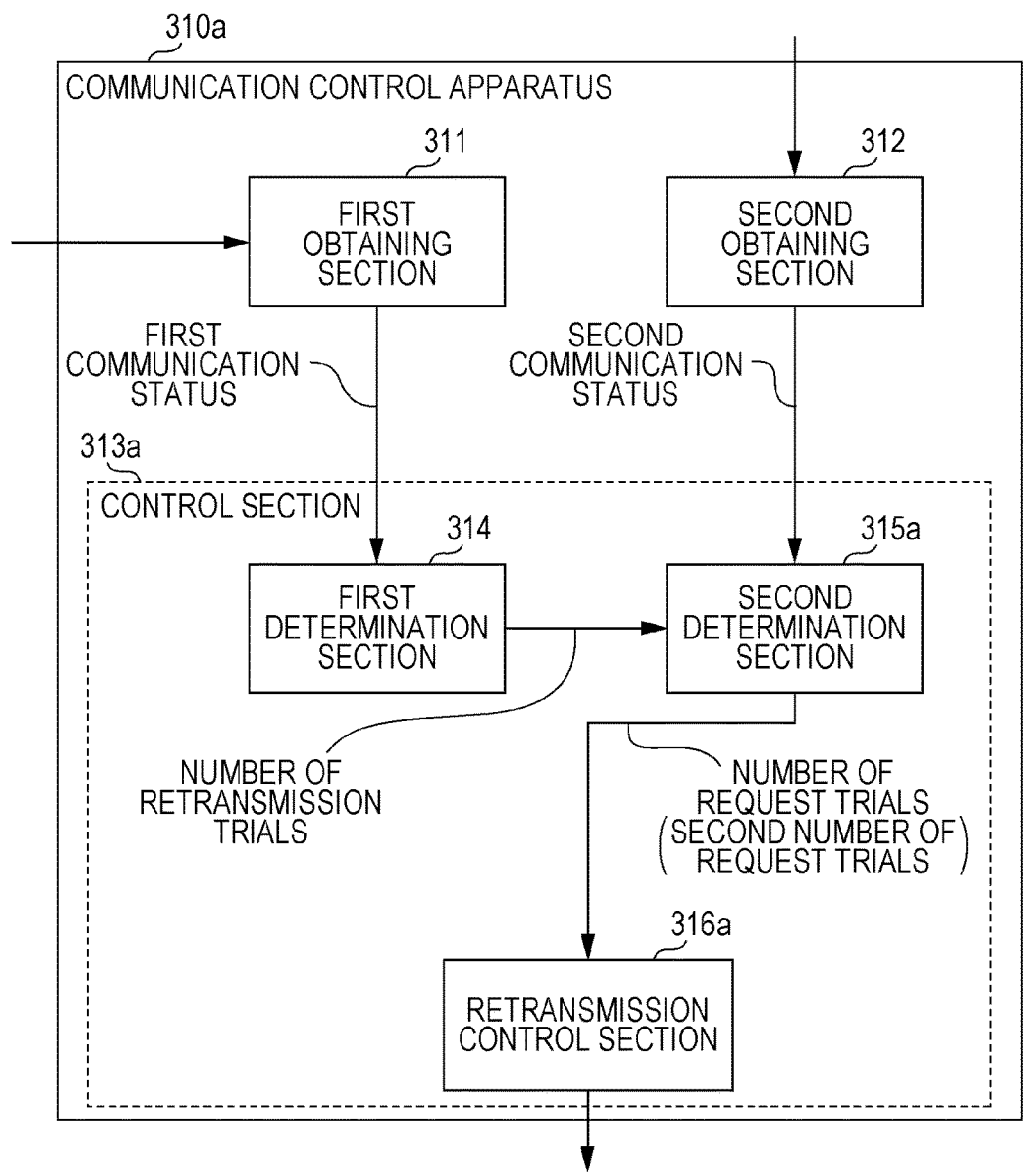
FIG. 10 is a block diagram illustrating a configuration of a communication control apparatus according to a modified example of the first embodiment.

FIG. 10 illustrates a configuration of a communication control apparatus 310a according to the modified example of the first embodiment. The communication control apparatus 310a includes the first obtaining section 311, the second obtaining section 312, and a control section 313a.

The control section 313a determines the number of transmission trials (the number of request trials) of a retransmission request message to be transmitted from the reception device 300 to the transmission device 200, the number of transmission trials being appropriate for the first communication status and the second communication status. The control section 313a controls transmission of a retransmission request message in accordance with the determined number of request trials. The control section 313a includes the first determination section 314, a second determination section 315a, and a retransmission control section 316a.

The first determination section 314 determines the number of retransmission trials that is appropriate for the first communication status similarly as in the first embodiment.

The second determination section 315a determines the number of request trials in accordance with the second communication status and the number of retransmission trials so that the number of times a retransmission request message arrives at the transmission device 200 is equal to the number of retransmission trials determined by the first determination section 314. That is, the second determination section 315a adjusts the number of request trials determined in accordance with the second communication status (without taking into consideration the first communication status) such that the number of request trials becomes larger as the number of retransmission trials determined by the first determination section 314 increases.

For example, the second determination section 315a first determines a first number of request trials, which is the number of transmission trials needed for a retransmission request message to arrive at the transmission device 200 at least once. Subsequently, the second determination section 315a determines a second number of request trials by multiplying the determined first number of request trials by the number of retransmission trials determined by the first determination section 314. The second number of request trials is used for control of transmission of a retransmission request message.

The retransmission control section 316a controls transmission of a retransmission request message to the transmission device 200 in accordance with the second number of request trials determined by the second determination section 315a. This retransmission request message need not necessarily contain information specifying the number of retransmission trials.

Figure 11:
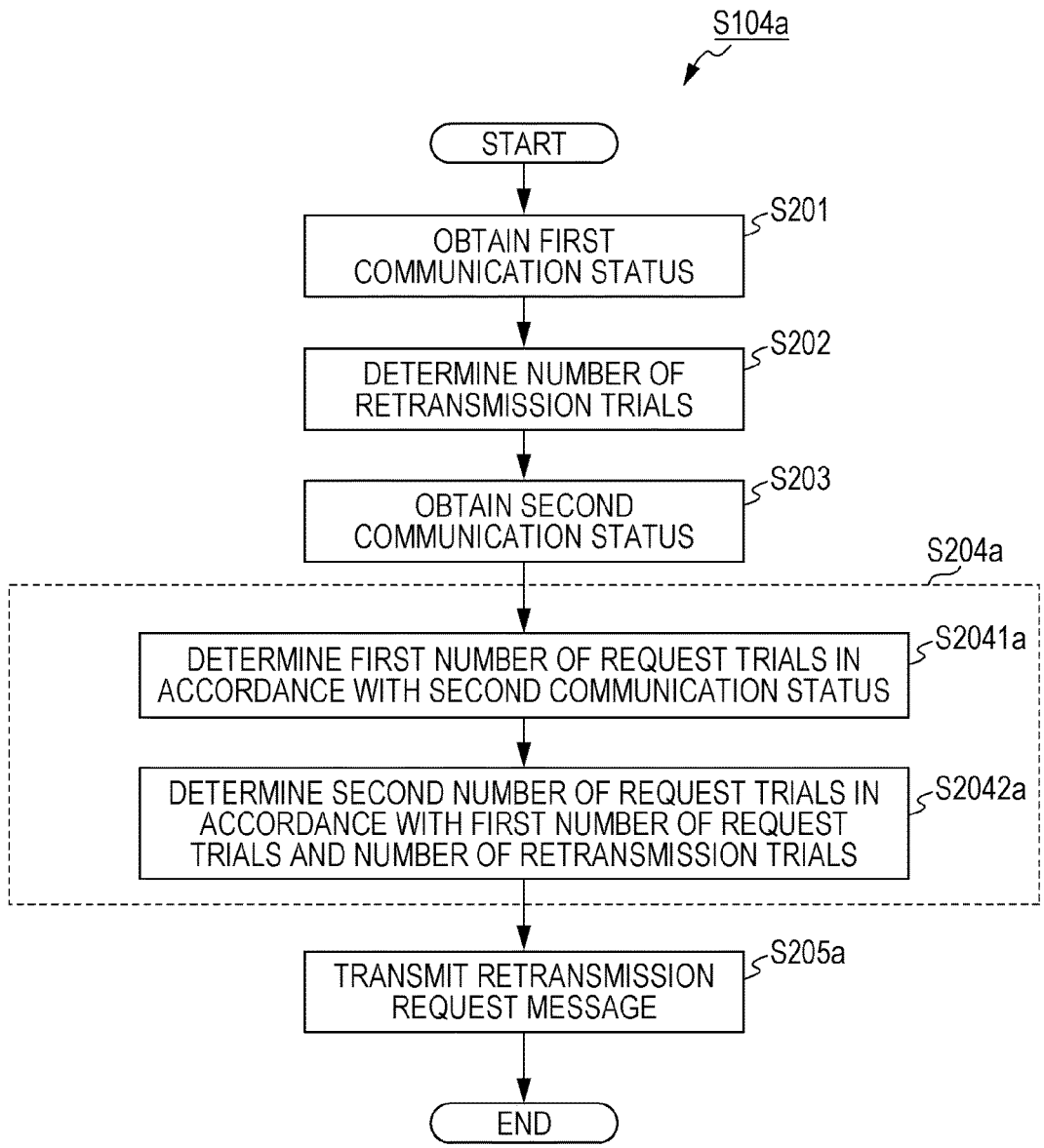
FIG. 11 is a flowchart illustrating processing operations performed by the communication control apparatus according to the modified example of the first embodiment.

Next, operations performed by the communication control apparatus 310a configured as described above will be described. FIG. 11 is a flowchart illustrating processing operations performed by the communication control apparatus 310a according to the modified example of the first embodiment. Specifically, FIG. 11 illustrates the details of step S104a in FIG. 6.

After processing in steps S201 to S203 has been performed similarly as in FIG. 7, the second determination section 315a determines the number of request trials in accordance with the second communication status and the number of retransmission trials so that the number of times a retransmission request message arrives at the transmission device 200 is equal to the number of retransmission trials determined by the first determination section 314 (step S204a).

Specifically, the second determination section 315a determines the first number of request trials, which is the number of transmission trials needed for a retransmission request message to arrive at the transmission device 200 at least once (step S2041a). Subsequently, the second determination section 315a determines the second number of request trials by multiplying the first number of request trials determined in step S2041a by the number of retransmission trials determined in step S202 (step S2042a).

The retransmission control section 316a transmits a retransmission request message to the transmission device 200 via the transmission section 303 in accordance with the second number of request trials (step S205a).

Next, a specific example of operations performed in the communication system according to this modified example as described above will be described. FIG. 12 is a diagram for describing a specific example of operations performed in the communication system according to the modified example of the first embodiment.

In FIG. 12, data packets respectively having the sequence numbers "0" to "2" are transmitted and loss of the data packet having the sequence number "1" occurs similarly as in FIG. 9 of the first embodiment.

Then, the first determination section 314 determines the number of retransmission trials to be "2" in accordance with the first packet loss rate of "1%" similarly as in FIG. 9. The second determination section 315a determines the first number of request trials to be "4" in accordance with the second packet loss rate of "3%". Furthermore, the second determination section 315a determines the second number of request trials to be "8" by multiplying the first number of request trials "4" by the number of retransmission trials "2". As a result, a retransmission request packet is transmitted to the transmission device 200 eight times, and the retransmission request packet arrives at the transmission device 200 twice.

The retransmission control section 203 of the transmission device 200 retransmits a data packet identical to the lost data packet a number of times equal to the number of times the retransmission request packet arrives. As a result, the retransmitted data packet identical to the lost data packet arrives at the reception device 300 once.

As described above, a retransmission request packet arrives at the transmission device 200 at least a number of times equal to the number of retransmission trials calculated by the first determination section 314. The transmission device 200 transmits a packet identical to the lost packet once each time a retransmission request packet arrives. Accordingly, the packet identical to the lost packet is transmitted at least a number of times equal to the number of retransmission trials determined by the first determination section 314. As a result, the retransmitted packet identical to the lost packet arrives at the reception device 300 at least once.

As described above, the communication control apparatus 310a according to this modified example is able to determine the number of transmission trials of a retransmission request message (the number of request trials) in accordance with both of the first communication status and the second communication status. That is, the communication control apparatus 310a is able to determine the number of request trials that is appropriate for both of the first communication status and the second communication status. Therefore, the transmission device 200 retransmits data identical to lost data each time a retransmission request message arrives, and it becomes possible to control the number of retransmission trials with a simple configuration.

Second Embodiment

Background Findings

As illustrated in FIGS. 1B and 1C, in ARQ, the reception device 12 requests the transmission device 11 to retransmit data identical to lost data (FIG. 1B), and the transmission device 11 retransmits the data identical to the lost data to the reception device 12 (FIG. 1C). In this case, when taking into consideration loss of retransmission data, it is effective to retransmit the data identical to the lost data a plurality of times until the retransmitted data identical to the lost data arrives at the reception device 12 as illustrated in FIG. 2C.

In the case of retransmitting data identical to lost data a plurality of times, generally, retransmission may be performed a plurality of times within a time period from the time when data loss is detected until the estimated time of reproduction of the data identical to the lost data (hereinafter referred to as a "permitted reproduction time"). Here, if the interval between retransmissions for retransmission performed a plurality of times is a regular interval, it is possible to perform a larger number of retransmissions as the permitted reproduction time becomes longer. If the number of retransmission trials is fixed, it is possible to make the interval between retransmissions longer as the permitted reproduction time becomes longer.

Generally, it is possible to increase the probability of success in recovery of data loss (hereinafter referred to as the "recovery rate") as the number of retransmission trials increases. It is possible to suppress a bandwidth shortage caused by retransmission more as the interval between retransmissions becomes longer. Therefore, a longer permitted reproduction time is better from the viewpoint of the stability of communication.

However, if the permitted reproduction time is longer, a delay in reproduction may occur, which is a shortcoming. For example, if the permitted reproduction time becomes longer in a television conference system or the like, it becomes difficult to smoothly have a conversation using such a system. Therefore, the permitted reproduction time needs to be set appropriately in accordance with the characteristics of an application program (hereinafter referred to as an "application") which uses data.

Japanese Patent No. 4699187 shows that the permitted packet loss rate (permitted loss rate) and a permitted amount of time of a reproduction delay in reproducing packets (permitted reproduction time) are respectively inputted using input units. Then, the number of transmission trials and the interval between transmissions of a retransmission request message needed in order to achieve the permitted loss rate within the permitted reproduction time are determined. In this way, the permitted loss rate and the permitted reproduction time can be inputted in accordance with an application involved, and it is possible to attain the recovery rate of lost data and the real-time property of data reproduction that suit the application.

However, it is difficult to input the permitted reproduction time in advance as described in Japanese Patent No. 4699187. For example, even in the case where data is used in the same application, an appropriate permitted reproduction time may differ depending on the environment (for example, the processing capacity of a processor or the like) in which the data is used. Furthermore, it is not practical to input the permitted reproduction time each time data is used, in accordance with the environment in which the data is used because effort made by a user increases.

Even if data is used in the same application and the environment in which the data is used is the same, the communication status (for example, the network characteristics) dynamically changes in general.

Accordingly, the permitted reproduction time that was set may become inappropriate as time passes. That is, in the case where a permitted reproduction time set in advance is used, a situation where the permitted reproduction time is too long (for example, FIG. 13A) or a situation where the permitted reproduction time is too short (for example, FIG. 13B) may occur. In the case where the permitted reproduction time is too long as illustrated in FIG. 13A, a delay in data reproduction occurs and the real-time property of data reproduction is degraded. On the other hand, in the case where the permitted reproduction time is too short as illustrated in FIG. 13B, a bandwidth shortage occurs and the frequency of occurrence of data loss is increased.

Accordingly, a communication control apparatus according to this embodiment is a communication control apparatus for controlling recovery of data loss during data communication from a first communication device to a second communication device. The communication control apparatus includes a obtaining section configured to obtain a temporal change in a communication load between the first communication device and the second communication device, a change section configured to dynamically change a permitted time and an interval between transmissions on the basis of the temporal change in the communication load, the permitted time being a time that is permitted to be used by the second communication device for recovery of data loss, the interval between transmissions being an interval between transmissions of a retransmission request message that requests retransmission of data identical to lost data in a case where the retransmission request message is repeatedly transmitted from the second communication device to the first communication device, and a retransmission control section configured to control transmission of the retransmission request message in accordance with the interval between transmissions.

According to the configuration described above, the permitted time that is a time permitted to be used for recovery of data loss and the interval between transmissions of a retransmission request message can be dynamically changed in accordance with the communication load. Therefore, it becomes possible to balance suppression of increase in loss due to communication congestion with reduction in a reproduction delay. For example, it is possible to efficiently recover loss of packets of video and/or audio data occurring during communication over the Internet while suppressing congestion caused by the communication load. In this case, it is also possible to reduce a reproduction delay in reproducing video and/or audio data, and it is possible to improve the reproduction quality of images and/or sounds.

For example, the change section may dynamically change the permitted time on the basis of the temporal change in the communication load, and may determine the interval between transmissions that is appropriate for the permitted time so that the retransmitted data identical to the lost data arrives at the second communication device within the permitted time in a case where the retransmission request message has been transmitted a number of times equal to a number of request trials.

According to the configuration described above, it is possible to determine the interval between transmissions of a retransmission request message so that retransmitted data identical to lost data arrives at the second communication device within a permitted time, by dynamically changing the permitted time on the basis of the temporal change in the communication load.

For example, the change section may increase the permitted time in a case where the communication load is increasing, and may decrease the permitted time in a case where the communication load is decreasing.

According to the configuration described above, the permitted time can be changed appropriately in accordance with the increase or decrease of the communication load, and it becomes possible to balance suppression of communication congestion with reduction in a reproduction delay.

For example, the change section may increase the permitted time in a case where a duration during which the communication load keeps increasing exceeds a first threshold time, and may decrease the permitted time in a case where a duration during which the communication load keeps decreasing exceeds a second threshold time.

According to the configuration described above, the permitted time can be changed on the basis of the result of comparison between the duration during which the communication load keeps increasing or decreasing and the threshold. Therefore, it is possible to suppress frequent changes in the permitted time and the interval between transmissions, and it is possible to attain stable data reproduction and communication.

For example, the obtaining section may estimate a temporal change in the communication load in accordance with at least one of temporal changes in a loss frequency, a delay time, and traffic in the first data communication.

According to the configuration described above, a temporal change in the communication load can be estimated on the basis of at least one of the temporal changes in the loss frequency, delay time, and traffic.

For example, the obtaining section may obtain a temporal change in the communication load from outside the communication control apparatus.

According to the configuration described above, a temporal change in the communication load can be obtained from outside the communication control apparatus.

Note that these general and specific aspects of the present disclosure may be implemented in a form of a system, a method, an integrated circuit, a computer program, or a computer-readable recording medium, such as a CD-ROM, or may be implemented using any combination of a system, a method, an integrated circuit, a computer program, and a recording medium.

Hereinafter, an example of a communication system including a communication control apparatus according to this embodiment will be specifically described. Description of configurations and processing similar to those in the first embodiment will be omitted as appropriate.

Configuration

Configuration of Communication System

Figure 14:
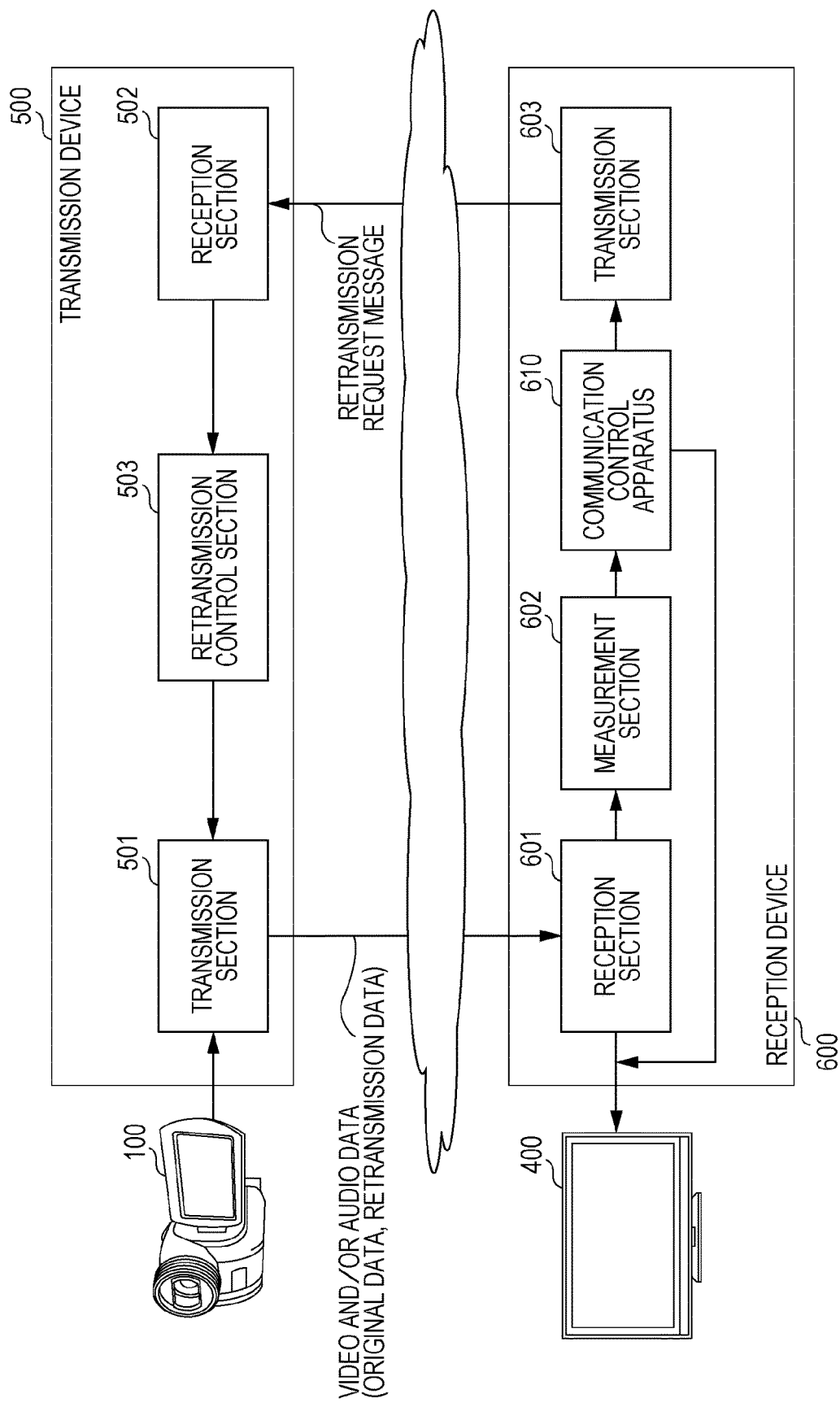
FIG. 14 is a diagram illustrating a configuration of a communication system according to a second embodiment.

FIG. 14 illustrates a configuration of a communication system according to the second embodiment. This communication system (remote display system) includes the input device 100, a transmission device 500, a reception device 600 including a communication control apparatus 610, and the output device 400.

The transmission device 500 is an example of the first communication device. The transmission device 500 transmits video and/or audio data to the reception device 600 over the Internet. The transmission device 500 is, for example, a personal computer, a smartphone, a tablet computer, or a communication adapter.

The reception device 600 is an example of the second communication device. The reception device 600 transmits video and/or audio data received from the transmission device 500 to the output device 400. The reception device 600 is, for example, a personal computer, a set top box, a disc player or a recorder, or a communication adapter.

Next, configurations of the transmission device 500 and the reception device 600 in this embodiment will be described in further detail.

Configuration of Transmission Device

The transmission device 500 includes a transmission section 501, a reception section 502, and a retransmission control section 503.

The transmission section 501 transmits video and/or audio data obtained from the input device 100 to the reception device 600 over the Internet similarly as in the transmission section 201 of the first embodiment.

The reception section 502 receives a retransmission request message from the reception device 600. Then, the reception section 502 communicates the retransmission request message to the retransmission control section 503.

The retransmission control section 503 retransmits, to the reception device 600 via the transmission section 501, data identical to data lost (lost data) during data communication from the transmission device 500 to the reception device 600 (first data communication) once each time a retransmission request message is received. For example, the retransmission control section 503 retransmits a packet corresponding to the lost data among a plurality of packets retained in the transmission section 501 or a buffer memory (not illustrated).

Configuration of Reception Device

The reception device 600 includes a reception section 601, a measurement section 602, a transmission section 603, and the communication control apparatus 610.

The reception section 601 receives video and/or audio data from the transmission device 500 as in the reception section 301 of the first embodiment. The reception section 601 transmits signals based on the received video and/or audio data to the output device 400.

The reception section 601 communicates information used to measure a temporal change in the communication load in the first data communication to the measurement section 602. Specifically, the reception section 601 communicates information about packets received from the transmission device 500 to the measurement section 602, for example.

The measurement section 602 measures the communication status of the first data communication. For example, the measurement section 602 measures at least one of the temporal changes in the loss frequency, delay time, and traffic. Specifically, the measurement section 602 may measure the loss frequency and delay time in the first data communication by using a response packet returned in response to an echo request message transmitted to the transmission device 500, for example. The measurement section 602 may measure temporal changes in the loss frequency and delay time by repeatedly performing such measurement.

The transmission section 603 transmits a retransmission request message according to an instruction given by the communication control apparatus 610. For example, the transmission section 603 transmits a retransmission request message at an interval between transmissions calculated by the communication control apparatus 610. Specifically, the transmission section 603 repeatedly transmits a retransmission request message at an interval between transmissions calculated by the communication control apparatus 610 until the number of repetitions reaches the number of request trials, for example. The transmission section 603 may repeatedly transmit a retransmission request message at a time interval specified by the communication control apparatus 610 until the number of repetitions reaches the number of request trials, for example.

The communication control apparatus 610 is an apparatus used to recover data loss during the first data communication. Specifically, the communication control apparatus 610 controls transmission processing of transmitting a message (retransmission request message) which requests retransmission of lost data. The communication control apparatus 610 communicates a permitted time to the output device 400. The detailed configuration of the communication control apparatus 610 will be described below.

Configuration of Communication Control Apparatus

Figure 15:
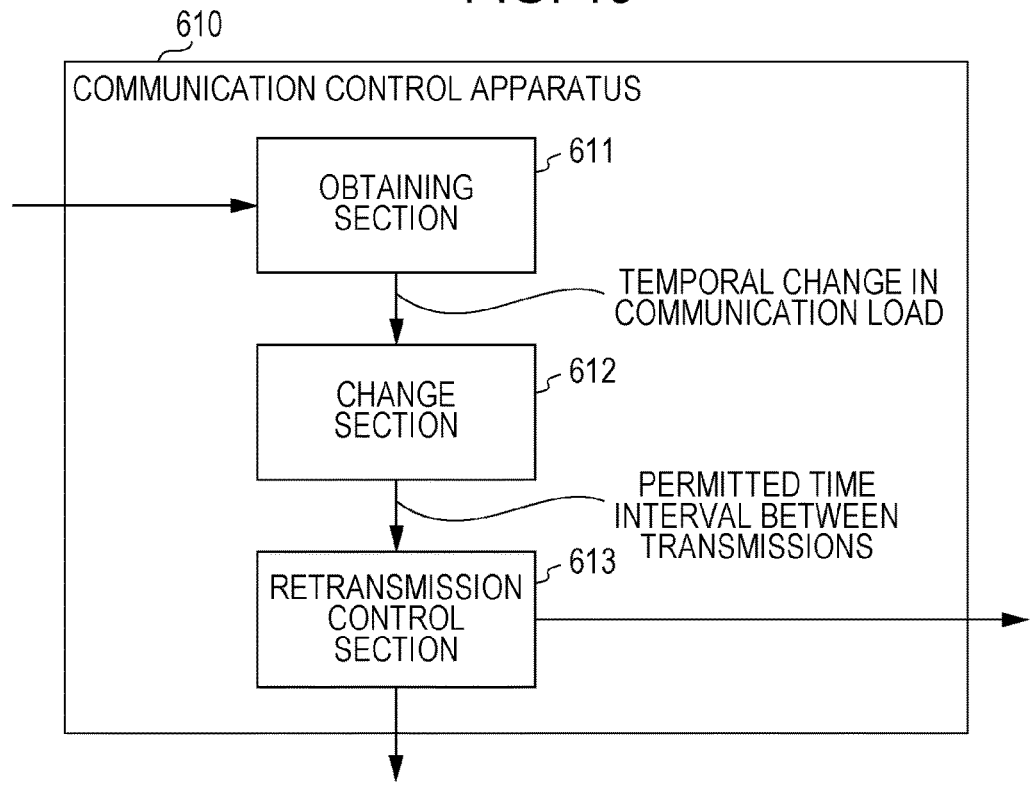
FIG. 15 is a block diagram illustrating a configuration of a communication control apparatus according to the second embodiment.

FIG. 15 illustrates a configuration of the communication control apparatus 610 according to the second embodiment. The communication control apparatus 610 includes an obtaining section 611, a change section 612, and a retransmission control section 613.

The obtaining section 611 is an example of the obtaining section. The obtaining section 611 obtains a temporal change in the communication load between the transmission device 500 and the reception device 600. Here, the communication load indicates the degree of congestion of paths used in the first data communication. In other words, the communication load indicates the degree of shortage of the communication bands between the transmission device 500 and the reception device 600.

Specifically, the obtaining section 611 estimates a temporal change in the communication load on the basis of at least one of the temporal changes in the loss frequency, delay time, and traffic in the first data communication, the temporal changes having been obtained from the measurement section 602, for example. The obtaining section 611 may estimate that the communication load is increasing in the case where the loss frequency, delay time, or traffic is increasing, for example. On the other hand, the obtaining section 611 may estimate that the communication load is decreasing in the case where the loss frequency, delay time, or traffic is decreasing, for example.

Note that the obtaining section 611 may obtain a temporal change in the communication load from outside the communication control apparatus 610. For example, the obtaining section 611 may obtain a temporal change in the communication load from a monitoring server that monitors the network.

The obtaining section 611 may obtain the number of transmission trials of a retransmission request message (the number of request trials). For example, the obtaining section 611 may determine the number of retransmission trials of data identical to lost data in accordance with the first communication status similarly as in the first embodiment, and may obtain the determined number of retransmission trials as the number of request trials. Note that the obtaining section 611 may obtain the number of request trials from outside the communication control apparatus 610.

The change section 612 dynamically changes the permitted time and the interval between transmissions of a retransmission request message on the basis of the temporal change in the communication load obtained by the obtaining section 611. The permitted time is a time that is permitted to be used by the reception device 600 for recovery of data loss. For example, the permitted time may be the permitted reproduction time. That is, the permitted time may be a time period from the time when data loss is detected until the estimated time of reproduction of data identical to the lost data. The interval between transmissions is a time interval at which a retransmission request message is transmitted in the case of repeatedly transmitting the retransmission request message from the reception device 600 to the transmission device 500.

The permitted time may be a time period from the time when data loss is detected until when data identical to the lost data is received.

Specifically, the change section 612 first dynamically changes the permitted time on the basis of the temporal change in the communication load. For example, the change section 612 increases the permitted time when the communication load is increasing, and decreases the permitted time when the communication load is decreasing.

Next, the change section 612 determines the interval between transmissions that is appropriate for the permitted time so that retransmitted data identical to lost data arrives at the reception device 600 within the permitted time in the case where a retransmission request message has been transmitted a number of times equal to the number of request trials. For example, the change section 612 determines the number of request trials so that the result of multiplying the interval between transmissions by the number of request trials is equal to or less than the permitted time.

The retransmission control section 613 controls transmission of a retransmission request message in accordance with the interval between transmissions changed by the change section 612. That is, the retransmission control section 613 transmits a retransmission request message at the changed interval between transmissions.

Operations

Next, operations performed in the communication system configured as described above will be described with reference to the drawings.

Operations Performed by Reception Device

Figure 16:
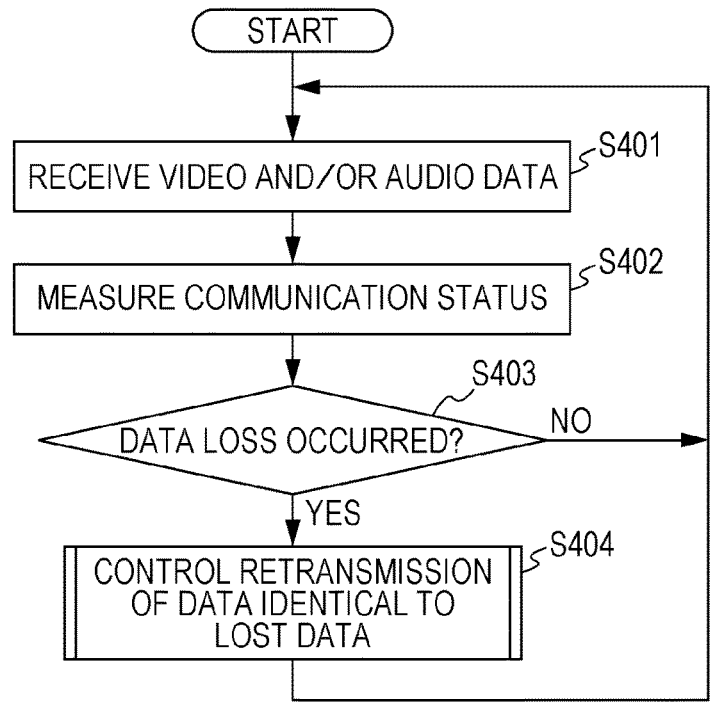
FIG. 16 is a flowchart illustrating processing operations performed by a reception device according to the second embodiment.

FIG. 16 is a flowchart illustrating processing operations performed by the reception device 600 according to the second embodiment. Here, a case where a certain value (for example, an initial value) is set for the permitted reproduction time will be described.

First, the reception section 601 receives video and/or audio data from the transmission device 500 (step S401). The measurement section 602 measures the communication status of the first data communication (step S402), and determines whether or not data loss has occurred (step S403).

Here, if data loss has not occurred (No in step S403), the flow returns to step S401. That is, in the case where the measurement section 602 has not detected loss of video and/or audio data, for example, the measurement section 602 keeps measuring the communication status of the first data communication.

On the other hand, if data loss has occurred (Yes in step S403), the communication control apparatus 610 controls retransmission of data identical to the lost data (step S404), and the flow returns to step S401. That is, in the case where the measurement section 602 has detected loss of video and/or audio data, for example, the communication control apparatus 610 performs processing for controlling retransmission of data identical to the lost data. Operations performed by the communication control apparatus 610 in step S404 will be described with reference to FIG. 17.

FIG. 17 is a flowchart illustrating processing operations performed by the communication control apparatus 610 according to the second embodiment. The obtaining section 611 first obtains a temporal change in the communication load (step 3501). The obtaining section 611 also obtains the number of transmission trials of a retransmission request message (the number of request trials) (step S502). The obtained temporal change in the communication load and the number of request trials are inputted to the change section 612.

The change section 612 determines whether or not a duration during which the communication load keeps increasing (hereinafter referred to as an "increase duration") exceeds a first threshold time (step S503). Here, if the increase duration exceeds the first threshold time (Yes in step S503), the change section 612 increases the permitted time (step S504). That is, the change section 612 newly sets the permitted time that is longer than the current permitted time.

On the other hand, if the increase duration does not exceed the first threshold time (No in step S503), the change section 612 determines whether or not a duration during which the communication load keeps decreasing (hereinafter referred to as a "decrease duration") exceeds a second threshold time (step S505). Here, if the decrease duration exceeds the second threshold time (Yes in step 3505), the change section 612 decreases the permitted time (step S506). That is, the change section 612 newly sets the permitted time that is shorter than the current permitted time. On the other hand, if the decrease duration does not exceed the second threshold time (No in step S505), the change section 612 does not change the permitted time.

Next, the change section 612 determines the interval between transmissions that is appropriate for the permitted time so that retransmitted data identical to lost data arrives at the reception device 600 within the permitted time in the case where a retransmission request message has been transmitted a number of times equal to the number of request trials (step S507). For example, the change section 612 calculates the interval between transmissions that is appropriate for the permitted time in accordance with expression (3) below.

$$\text{Interval between Transmissions} = (\text{Permitted Time} - \text{RTT})/\text{Number of Request Trials} \quad (3)$$

Here, RTT means round-trip time (RTT). That is, RTT is a round-trip communication delay time between the transmission device 500 and the reception device 600.

Next, the retransmission control section 613 controls transmission of a retransmission request message in accordance with the interval between transmissions determined in step S507 (step S508). That is, the retransmission control section 613 transmits, to the transmission device 500 via the transmission section 603, a retransmission request message at the determined interval between transmissions a number of times equal to the number of request trials (step S508).

Specific Example of Operations Performed in Communication System

Figure 18A:
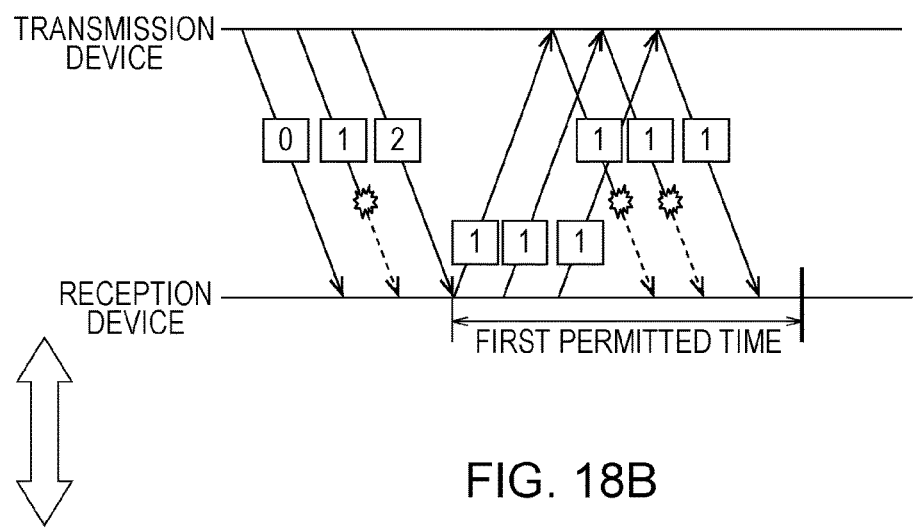
FIGS. 18A to 18C are diagrams for describing specific examples of operations performed in the communication system according to the second embodiment.
Figure 18B:
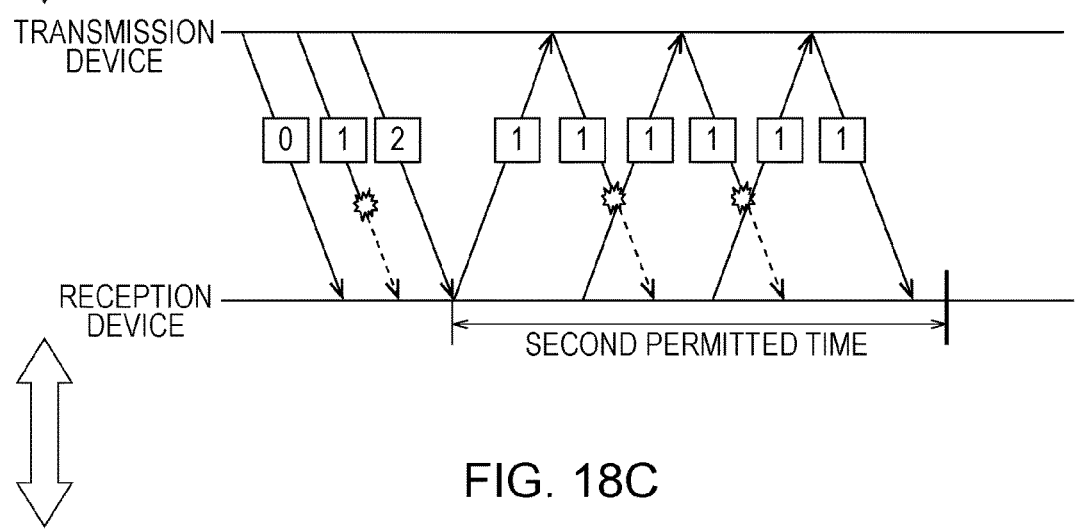
Figure 18C:
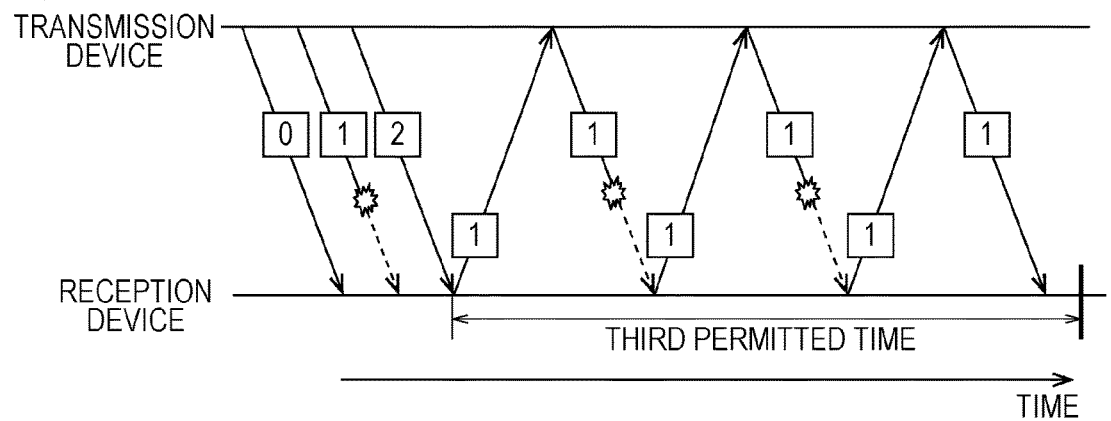

Next, a specific example of operations performed in the communication system according to this embodiment described above will be described. FIGS. 18A to 18C are diagrams for describing specific examples of operations performed in the communication system according to the second embodiment. Specifically, FIG. 18A illustrates the interval between transmissions in the case where a first permitted time is set. FIG. 18B illustrates the interval between transmissions in the case where a second permitted time that is longer than the first permitted time is set. FIG. 18C illustrates the interval between transmissions in the case where a third permitted time that is longer than the second permitted time is set.

For example, in FIG. 18B, when loss of a data packet having the sequence number "1" occurs, the obtaining section 611 of the communication control apparatus 610 obtains a temporal change in the communication load.

Here, if the decrease duration during which the communication load keeps decreasing exceeds the second threshold time, the change section 612 decreases the permitted time from the second permitted time to the first permitted time. Then, the change section 612 determines the interval between transmissions on the basis of the first permitted time. As a result, as illustrated in FIG. 18A, a retransmission request message is transmitted at the interval between transmissions shorter than that in FIG. 18B and therefore the communication band is effectively used.

On the other hand, if the increase duration during which the communication load keeps increasing exceeds the first threshold time, the change section 612 increases the permitted time from the second permitted time to the third permitted time. Then, the change section 612 determines the interval between transmissions on the basis of the third permitted time. As a result, as illustrated in FIG. 18C, a retransmission request message is transmitted at the interval between transmissions longer than that in FIG. 18B and therefore the communication load is reduced.

Effects

As described above, the communication control apparatus 610 according to this embodiment is able to dynamically change the permitted time that is a time permitted to be used for recovery of data loss and the interval between transmissions of a retransmission request message in accordance with the communication load. Therefore, the communication control apparatus 610 is able to balance suppression of increase in loss due to communication congestion with reduction in a reproduction delay. The communication control apparatus 610 is able to efficiently recover packet loss relating to video and/or audio data occurring during communication over the Internet while suppressing congestion caused by the communication load, for example. In this case, the communication control apparatus 610 is able to reduce a reproduction delay in reproducing video and/or audio data, and is able to improve the reproduction quality of images and/or sounds.

The communication control apparatus 610 according to this embodiment is able to change the permitted time on the basis of the result of comparison between the duration during which the communication load keeps increasing or the duration during which the communication load keeps decreasing and the threshold. Therefore, the communication control apparatus 610 is able to suppress frequent changes in the permitted time and the interval between transmissions, and is able to attain stable data reproduction and communication.

Other Embodiments

A communication control apparatus according to one aspect or a plurality of aspects has been described with reference to embodiments, however, the present disclosure is not limited to the embodiments. Various modifications to the embodiments that may be conceived by those skilled in the art or an embodiment configured by combining constituent elements in different embodiments may be included in the scope of one aspect or a plurality of aspects, without departing from the essence of the present disclosure.

Hereinafter, other embodiments will all be described.

A communication control apparatus may be configured by combining constituent elements of the communication control apparatus according to the first embodiment described above and constituent elements of the communication control apparatus according to the second embodiment described above. Specifically, a communication control apparatus may include the first obtaining section 311, the second obtaining section 312, the obtaining section 611, the first determination section 314, the second determination section 315 (315a), the change section 612, and the retransmission control section 613, for example. With this configuration, the communication control apparatus is able to control transmission of a retransmission request message in accordance with the number of request trials determined as in the first embodiment and the interval between transmissions dynamically changed as in the second embodiment.

In the embodiments described above, an example of a case has been described where data communication is communication performed over the Internet, however, the data communication need not be communication performed over the Internet. For example, the data communication may be communication performed over a wired or wireless network, such as a local area network or a wide area network. The data communication may be mobile communication used by a portable phone or the like. Furthermore, the data communication need not be packet communication.

In the embodiments described above, an example of a case has been described where the communication system is a remote display system, however, the communication system need not be a remote display system. For example, the communication system may be a system in which text data, image data, program data, or the like is transmitted from the first communication device to the second communication device.

In the embodiments described above, the communication control apparatus is integrated into the reception device, however, the communication control apparatus need not be integrated into the reception device. The communication control apparatus may be configured as an apparatus provided separately from the reception device. For example, the communication control apparatus may be integrated into a server that is connected to a plurality of reception devices over the network. In such a case, the communication control apparatus may control the plurality of reception devices.

In the first embodiment described above, an example of a case has been described where the first communication status and the second communication status include the packet loss rate, however, the first communication status and the second communication status need not include the packet loss rate. That is, the first communication status and the second communication status may indirectly indicate the frequency of occurrence of data loss. For example, the first communication status and the second communication status may include the congestion degree of the communication paths, the communication load, information about occurrence of communication failures, or the like.

In the first embodiment described above, the number of retransmission trials and the number of request trials are calculated so as to satisfy expression (1) and expression (2) respectively, however, calculation need not necessarily be performed in this way. The number of retransmission trials and the number of request trials may be calculated using a function of the frequency of occurrence of loss. The number of retransmission trials and the number of request trials may be determined by referring to a table in which the number of retransmission trials and the number of request trials that correspond to the frequency of occurrence of loss are registered.

In the first embodiment described above, a retransmission request message contains information specifying the number of retransmission trials, however, a retransmission request message need not contain information specifying the number of retransmission trials. For example, information specifying the number of retransmission trials may be communicated in another message that is not a retransmission request message.

In the first embodiment described above, the second communication status is obtained from the transmission device, however, the second communication status need not be obtained from the transmission device. For example, the second communication status may be obtained from another device that monitors the second data communication.

In the modified example of the first embodiment described above, an example has been described where the number of retransmission trials, the first number of request trials, and the second number of request trials are sequentially determined, however, these numbers need not be sequentially determined in this way. For example, the number of request trials (the second number of request trials) that is appropriate for the first communication status and the second communication status may be directly determined by referring to a table or a function.

In the second embodiment described above, the increase duration and the decrease duration are used when changing the permitted time, however, these durations need not be used. For example, the permitted time may be increased regardless of the increase duration in the case where the communication load is increasing, and the permitted time may be decreased regardless of the decrease duration in the case where the communication load is decreasing.

In the second embodiment described above, the interval between transmissions is determined after the permitted time has been changed, on the basis of the permitted time obtained after such a change, however, the permitted time and the interval between transmissions need not be determined in this way. For example, the permitted time may be determined after the interval between transmissions has been changed on the basis of a temporal change in the communication load, on the basis of the interval between transmissions obtained after such a change. The interval between transmissions and the permitted time may be determined at the same time by referring to a table in which a plurality of combinations of the interval between transmissions and the permitted time are registered, for example.

Note that, in the embodiments described above, each constituent element may be configured by using dedicated hardware or by executing a software program applicable to each constituent element. Each constituent element may be implemented in such a manner that a program execution section, such as a central processing unit (CPU), a processor, or the like, reads and executes a software program recorded in a recording medium, such as a hard disk, a semiconductor memory, or the like. Here, software that implements the communication control apparatuses or the like according to the embodiments described above is a program as described below.

That is, the program causes a computer to perform a communication control method for controlling recovery of data loss during data communication from a first communication device to a second communication device. The method includes a first obtaining step of obtaining a first communication status indicating a frequency of occurrence of data loss during first data communication from the first communication device to the second communication device, a second obtaining step of obtaining a second communication status indicating a frequency of occurrence of data loss during second data communication from the second communication device to the first communication device, and a control step of controlling transmission processing of transmitting, from the second communication device to the first communication device, a retransmission request message that requests retransmission of data identical to lost data during the first data communication, in accordance with the first communication status and the second communication status.

INDUSTRIAL APPLICABILITY

The communication control apparatus of the present disclosure is able to improve the reproduction quality of images and/or sounds and therefore is usable in a video conference system or the like in which video and/or audio data are transmitted and received.

CROSS REFERENCE TO RELATED APPLICATION

The present application claims the benefit of Japanese Patent Application No. 2013-187981 filed on Sep. 11, 2013. The entire disclosure of the above-identified application, including the specification, drawings and claims, is incorporated herein by reference in its entirety.

What is claimed is:

1. A communication control apparatus for controlling recovery of data loss during data communication from a first communication device to a second communication device, the communication control apparatus comprising:
    an obtaining section configured to obtain a temporal change in a communication load between the first communication device and the second communication device;
    a change section configured to dynamically change a permitted time and an interval between transmissions on the basis of the temporal change in the communication load, the permitted time being a time that is permitted to be used by the second communication device for recovery of data loss, the interval between transmissions being an interval between transmissions of a retransmission request message that requests retransmission of data identical to lost data in a case where the retransmission request message is repeatedly transmitted from the second communication device to the first communication device; and
    a retransmission control section configured to control transmission of the retransmission request message in accordance with the interval between transmissions.

2. The communication control apparatus according to claim 1,
    wherein the change section
    dynamically changes the permitted time on the basis of the temporal change in the communication load, and
    determines the interval between transmissions that is appropriate for the permitted time so that the retransmitted data identical to the lost data arrives at the second communication device within the permitted time in a case where the retransmission request message has been transmitted a number of times equal to a number of request trials.

3. The communication control apparatus according to claim 2,
    wherein the change section
    increases the permitted time in a case where the communication load is increasing, and
    decreases the permitted time in a case where the communication load is decreasing.

4. The communication control apparatus according to claim 3,
    wherein the change section
    increases the permitted time in a case where a duration during which the communication load keeps increasing exceeds a first threshold time, and
    decreases the permitted time in a case where a duration during which the communication load keeps decreasing exceeds a second threshold time.

5. The communication control apparatus according to claim 1,
    wherein the obtaining section estimates a temporal change in the communication load in accordance with at least one of temporal changes in a loss frequency, a delay time, and traffic in the first data communication.

6. The communication control apparatus according to claim 1,
    wherein the obtaining section obtains a temporal change in the communication load from outside the communication control apparatus.

* * * * *